INVENTORS.
SIMON P. FLEMMING JR.
GEORGE P. FUTAS

Aug. 18, 1970 S. P. FLEMMING, JR., ET AL 3,525,081

AUXILIARY STORE ACCESS CONTROL FOR A DATA PROCESSING SYSTEM

Filed June 14, 1968 10 Sheets-Sheet 2

Aug. 18, 1970 S. P. FLEMMING, JR., ET AL 3,525,081

AUXILIARY STORE ACCESS CONTROL FOR A DATA PROCESSING SYSTEM

Filed June 14, 1968 10 Sheets-Sheet 4

RRS, DP

CWR, DP

MAIN MEMORY TIMING SIGNAL WAVEFORMS

EXTENDED MEMORY WAVEFORMS AND TIMING DIAGRAM - READ

EXTENDED MEMORY WAVEFORMS AND TIMING DIAGRAM - WRITE

United States Patent Office 3,525,081
Patented Aug. 18, 1970

3,525,081

AUXILIARY STORE ACCESS CONTROL FOR A DATA PROCESSING SYSTEM

Simon P. Flemming, Jr., North Syracuse, N.Y., and George P. Futas, San Diego, Calif., assignors to Massachusetts Institute of Technology, Cambridge, Mass., a corporation of Massachusetts, and General Electric Company, Schenectady, N.Y., a corporation of New York Filed June 14, 1968, Ser. No. 737,000
Int. Cl. G06f *13/04*
U.S. Cl. 340—172.5 21 Claims

ABSTRACT OF THE DISCLOSURE

A data processing system wherein apparatus controls the transfer of information between a working store and auxiliary store space provided and utilized for storing a predetermined quantity of information and wherein the apparatus further provides for storing information in normally unutilized space thereby increasing the auxiliary store capacity and provides for separate access to each space for implementing the transfer of the information as required by the system.

BACKGROUND OF THE INVENTION

This invention relates to data processing systems and more particularly to apparatus for controlling access to information in a circulating auxiliary store and the transfer of information between the working and auxiliary stores of a data processing system.

One form of data processing system comprises at least one computer, at least one small capacity quick access working store, a relatively large capacity circulating auxiliary store and a plurality of peripheral control units each coupled to at least one peripheral device. In such a data processing system a series of programs are executed by the computer under control of an operating system which is a collection of programs that are executive or supervisory in nature and provide overall coordination and control of the total data processing system. This series of programs also includes subject programs which are application oriented programs to perform various data processing jobs providing results required by users. Test and diagnostic programs are also included to perform various operational tests for exercising various system components to determine the cause of equipment malfunctions.

In data processing systems required to execute a large number of programs, the quick-access working store capacity is too costly to be large enough to contain all of the operating system programs, subject programs, data to be processed, data which is the result of processing, and test and diagnostic programs. Consequently, only the programs and data most frequently used or currently in process are normally located in working store and the remaining programs and data are located in the relatively large capacity slow access circulating auxiliary store. Since the auxiliary store contains a major portion of system programs and data, it is essential that the programs and data not currently in process remain without unintentional alteration during the operation of any of the separate programs which require access to auxiliary store locations. As the number of programs and data increases, the capacity limit of the auxiliary store is also exceeded and it becomes necessary to provide additional auxiliary store space. The available auxiliary store space must therefore be utilized efficiently to provide maximum storage capacity and access to the space controlled in a manner which will prevent unintentional alteration or desruction of information stored in the space.

Generally control of information movement between working and auxiliary stores in the system described comprises expeditiously transferring data to be processed, data which is the result of processing, and the programs or parts of programs providing the required data processing functions between the working and auxiliary stores and controlling each of the working and auxiliary stores to provide efficient storage and retrieval of the information being transferred. Such control may be effected by one of the peripheral control units. Auxiliary stores normally function as one of a plurality of peripheral devices being controlled by a peripheral control unit.

One form of auxiliary storage device suitable for use may be, for example, the sequential access magnetic disc storage file. This type of storage device is adapted to circulate continuously and be scanned by suitable data transfer apparatus associated with selected circumferential information storage tracks on a surface of a disc. One way of effecting a storage and retrieval operation in such a storage device is to have the surface covered with a suitable magnetic recording material and with which an electromagnetic read/write head, is adapted to record and read back electromagnetic indicia along a particular track adjacent the head. In such an auxiliary store when a new information is recorded along a particular track the electromagnetic indicia previously recorded along a particular track is replaced by the new information, therefore the previously recorded information is destroyed. Information is stored in locations spaced along the length of the track which are termed "sectors." Accordingly, each location is accessed in accordance with a designation specifying the corresponding sector. Between the end of each sector and the beginning of the next sector is an unutilized store space which is termed a "guard band." Guard bands are therefore located between adjacent sectors along the track. It is within a time interval during which this guard band between adjacent sectors is accessible by a head, that the control unit controlling the auxiliary store provides for specifying an operation such as a retrieval or storage operation which is to be performed by the auxiliary store at a next specified location. The guard band provides a time interval during which the read/write head recovers from one storage operation before performing a next different type of storage operation and during which the associated locating apparatus may switch the read/write heads of the tracks for accessing locations in a different track. In such an auxiliary store the length of the guard band space is determined by the switching time of the locating apparatus, the recovery time of the read/write heads and rate of rotation of disc.

All data processing operations are performed on oper- and words under control of instruction or control words of programs. An operand word represents a unit of information to be processed or information which is the result of processing. An instruction word hereinafter referred to as an instruction, designates a particular operation for the computer to perform. A control word designates a particular type of peripheral device operation or data transfer function for a peripheral control unit to control. Each control word comprises portions termed "address fields" which provide representations of specific locations in working and auxiliary stores that contain instruction, control or operand words.

The peripheral control unit gains access to working store locations by means of control words which are stored in working store and transferred to the control unit in response to a computer executing a particular instruction of an operating system program. Once the control unit receives a control word it performs autonomously to retrieve and execute additional control words to provide for data transfer operations.

Prior art peripheral control units provide for transfer of information between stores by controlling the access to the information of an auxiliary store by specifying a sector. One form of prior art peripheral control unit employs data control words comprising an address field which provides a representation of what is termed an "address," for identifying the specific sector and track in the auxiliary store which contains the information which is to be accessed. Each sector contains a specified number of words within the limits of each sector along each of the tracks. The capacity for storing information of the auxiliary store is therefore determined by the available storage space within the total number of accessible sectors. Increased capacity in such prior art auxiliary stores has been provided by increasing the density of information which is recorded in a given amount of storage space. The high density recording techniques employed require use of special coding and complex electronics for recovery and decoding of information. Even with higher density of information storage, as the limit of storage capacity is exceeded, there becomes no alternative but to add expensive additional auxiliary store units. This often requires a duplication of control units and techniques for extending addressing beyond existing limits of standard control units.

Therefore, it is an object of this invention to provide storage control apparatus for enabling increased storage capacity of an auxiliary storage unit.

Another object of this invention is to provide storage control apparatus for enabling utilization of existing storage space.

It is another object of this invention to provide control apparatus for utilizing existing addressing capabilities to provide additional addressing for added storage space.

Operating system requirements of a multiprogrammed data processing system frequently require addition of special programs such as the test and diagnostic programs for exercising various system components. Frequently, special programs are performed which require access to locations storing another program resulting in altering or destroying the stored program information. One type of such special program may be, for example, a test and diagnostic program for testing the operation of the auxiliary store. One form of such a program exercises the auxiliary store by expeditiously accessing all sectors and performing reading and writing operations at all sectors of every track of the auxiliary store. This type of testing, during a writing operation, alters or destroys the program information which is normally stored in the auxiliary store sectors. Testing to determine if a read/write head is defective may, for example, involve supplying test information words to the auxiliary store for writing in sectors and then determining the correctness of these words after they are read from the auxiliary store. Testing for correct sector addressing frequently requires accessing all tracks and all sectors in a manner such that every valid track and sector address of the auxiliary store is tested.

Prior art peripheral control units provide for testing the operation of an auxiliary store by storing test and diagnostic program information in specific sectors reserved for that purpose. During the test operation the program provides for reading and writing only at the reserved sectors of particular tracks. This does not allow for testing addresses corresponding to all sector locations. In order to provide for the testing of all addresses and read/write heads it is necessary for the program information stored in the auxiliary store locations to be removed from the auxiliary store and then replaced following testing operations to prevent destruction of the information. This requires additional time for removal of and restoration of information and increases the possibility of altering the information as it is being retrieved from and restored to sector locations.

It is therefore an object of the present invention to provide control apparatus for controlling access to test each address specifying sectors of an auxiliary store without altering or destroying information stored in the sectors.

Another object of this invention is to provide a storage control apparatus for utilizing existing addressing capability to address all locations for test purposes and for performing the test operations without alteration or destruction of normally stored program information and data at each addressible sector.

SUMMARY OF THE INVENTION

The foregoing objects are achieved according to one embodiment of the instant invention by providing in a multiprogrammed data processing system storage control apparatus for automatically responding to information provided in a control word to direct the transfer of information between specific locations in two different data stores, to utilize normally unused storage space of an auxiliary store, and to control the accessibility of information stored in the auxiliary store to perform test operations.

The system of the instant invention includes at least one computer, at least one peripheral control unit, a large capacity circulating auxiliary store and at least one working store. Each computer is an automatic data processing equipment unit which, after it has been given an initial instruction, is capable of operating on a series of instructions to generate a desired result.

Each peripheral control unit is essentially an automatic data processing unit, which after it has been given an initial data control word is capable of retrieving and executing data control words in succession to provide for control of a specific data input/output operation. The peripheral control unit is capable of requesting a data control word from working store and after controlling its execution, requesting the next data control word from working store. A peripheral control unit of the system is coupled to the working store and the auxiliary store to provide for controllable transmission of information between the working store and auxiliary store. Each data control word includes address fields providing a representation of the following locations: (1) the working store cell address of the information to be transferred (2) the auxiliary store sector address of the information to be transferred, and (3) the working store address of the next data control word to be retrieved by the peripheral control unit. Each data control word includes a function portion in addition to the address field. The function portion specifies such transfer functions as the direction of transfer, other transfer functions, nontransfer functions and the mode of operation for controlling the auxiliary store. Associated with each direction of transfer function is a corresponding storage operation such as, for example, the retrieval and storage operations of the working and auxiliary stores. The peripheral control unit responds to the function portion of each data control word to generate the required communication to each store. Accordingly, each data control word may specify a storage operation change.

The peripheral control unit responds to a data control word specifying a mode of operation to enable the data control word to address either the storage space provided by a sector or the storage space provided by a guard band. As previously described the guard band provides space between each sector which is normally not utilized for the storing of program information. The peripheral control unit of the system described employs a "Normal Mode" of operation to address each sector and a "Mode 1" mode of operation to address each guard band. Following receipt of a data control word specifying a particular mode of operation to establish addressing of sectors or guard bands, a next control word is required to specify the particular type of transfer operation. Operating in a first mode of operation termed the "Normal Mode," the peripheral control unit provides for addressing each sector and for controlling the retrieval or storage of information in the sector represented by the sector address. Operating in a second mode of operation termed "Mode 1" the control unit provides for addressing each guard band and for controlling a specified retrieval or storage operation in a guard band represented by the sector address. Each sector contains a storage capacity for a specified number of data words and each guard band similarly has a capacity for storing a predetermined number of data words. Thus, the peripheral control unit of the present invention provides for storing additional data words in the normally unutilized guard band space between each sector to increase the auxiliary store capacity. The sector addresses supplied by a data control word are employed to specify the address of either a sector or of a guard band. The control unit first responds to a data control word specifying a mode of operation to establish the mode of operation and then operates in a specific mode to respond to the sector address for controlling access to either a sector or a guard band.

When the operating system requires the execution of a test and diagnostic program for exercising operation of the auxiliary store, a data control word specifying a "Mode 1" operation is provided to the peripheral control unit which responds to successively following data control words specifying transfer operations to provide for storing and retrieving information in the guard bands. By reserving each sector for storing operating system and subject program information words and reserving each guard band for storing only test and diagnostic information words, it is possible during test and diagnostic program operation to write at guard bands corresponding to all addresses of sectors without altering operating system information stored in the sectors.

Accordingly, the peripheral control unit of the instant invention responds to data control word information to automatically establish different modes of operation for controlling access to the information words stored either in sectors or guard bands. Additional capacity is provided by utilizing the guard band space and the testing of all sector addresses and read/write heads is performed by writing information at guard bands without altering or destroying operating system and subject program information stored in the sectors.

BRIEF DESCRIPTION OF THE DRAWING

This invention will be described with reference to the accompanying drawings wherein.

DESCRIPTION OF THE PREFERRED EMBODIMENT

Figure 1:
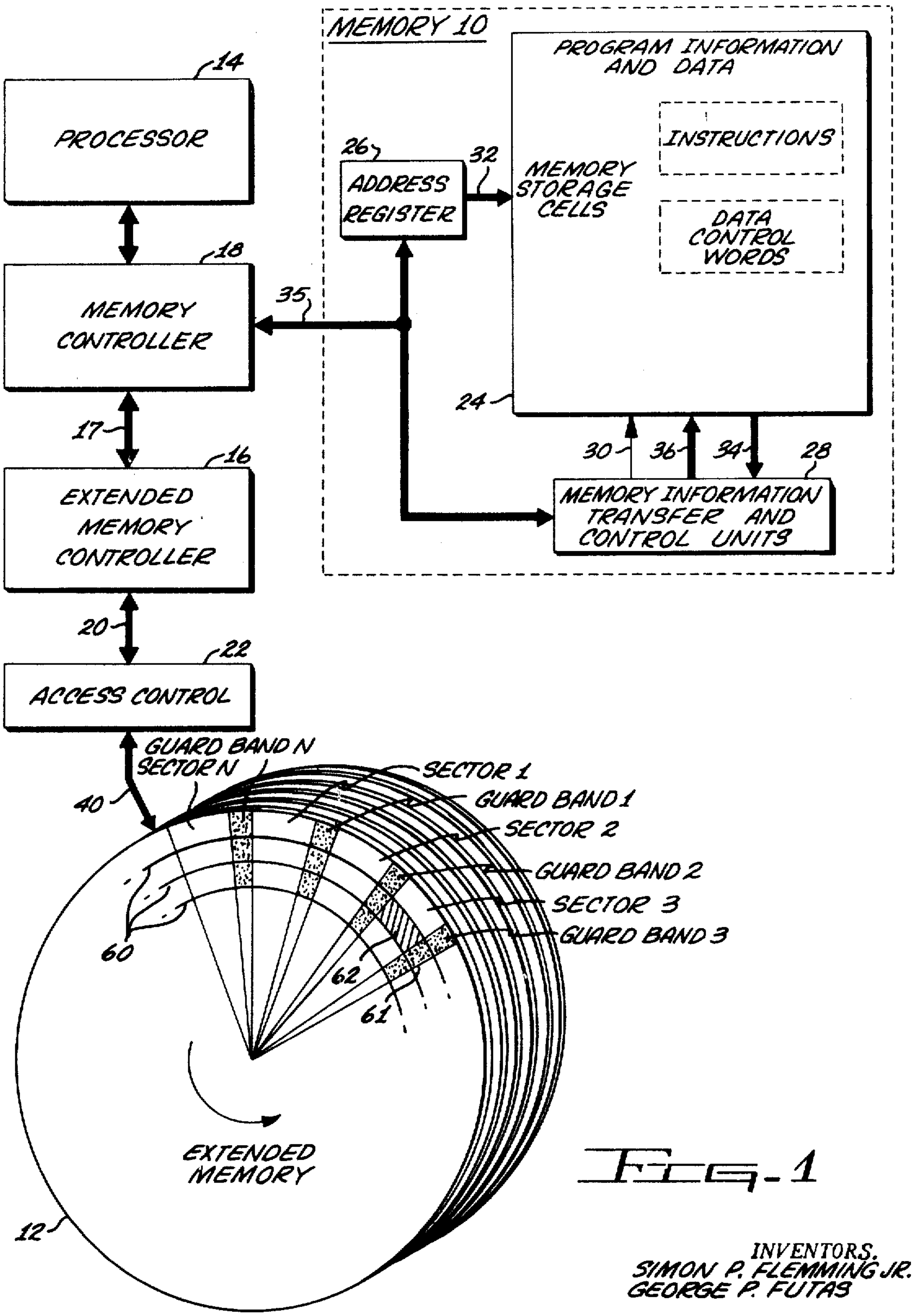
FIG. 1 is a block diagram of a multiprogrammed data processing system embodying the instant invention.

The data processing system of FIG. 1 is adapted to transfer large amounts of information very rapidly between a working store and an auxiliary store under control of control information stored in the working store. Lines interconnecting various components illustrated in FIG. 1 symbolically represent cables providing the plurality of conductors providing paths of data and control communications.

A working store to be referred to hereinafter as a main memory may comprise, by way of example, memory 10. The main memory provides for storage of information which is available for immediate processing by the data processing system. An auxiliary store which may be, for example, extended memory 12, is provided as an extension of the main memory. Extended memory 12 provides storage for overflow information which cannot be contained within the memory. Memory 10 is a quick access, low capacity memory which may be, for example, a conventional random access magnetic core store. Extended memory 12 may be, for example, a relatively slow access, high capacity convention circulating magnetic disc or drum store.

A computer, which may be for example, processor 14, is provided for performing the actual processing of information. A peripheral control unit, which may be for example, extended memory control 16, is provided for controlling the transfer of information between main memory 10 and extended memory 12.

All information to be processed is either retrieved from or stored in information units, known as data words in memory 10 by processor 14. Data words may also be retrieved from or stored in memory 10 by extended memory controller 16.

Data words are units of information utilized by the system and comprise instruction and control words of programs and operand words representing information to be processed or information which is the result of processing. The processor and controller respond to a series of instructions or control words known as a program to perform a particular data processing or transfer operation on operand words. The data word employed in the illustrated embodiment is composed of 36 binary digits.

Processor 14, controller 16, and memory 10 are connected to memory controller 18. Memory controller 18 receives and schedules all communications between memory 10 and processor 14 or extended memory controller 16. The memory controller also makes it possible for processor 14 or extended memory controller 16 to control memory 10.

Access control 22 is connected to extended memory controller 16 and extended memory 12 to respond to control signals received from controller 16 to perform a particular storage operation on data words at a specified location of memory 12. Access control 22 makes it possible for controller 16 to control memory 12.

Extended memory controller 16 functions as an automatic information transfer apparatus providing communication between memory controller 18 and access control 22 for transferring information between memory 10 and extended memory 12 at a high data transfer rate. Extended memory controller 16 also functions as a controller for memory controller 18 and access control 22 to control the storage functions of retrieval and storage of information in memory 10 and extended memory 12 respectively.

Each of memories 10 and 12 is an addressable memory, wherein a storage location is explicitly and uniquely specified by means of an address. Only a single data word may be stored in an addressable location of memory 10 where a predetermined number of data words may be stored in an addressable location of memory 12. The data word is retrieved from or inserted into a storage location of the addressable memory only after such memory is supplied with the address of the location.

Extended memory controller 16 operates autonomously to control the execution of a succession of data control words following initiation of operation, while the remainder of the system is available for other operations. The successions of data control words are parts of programs performed under the control of the operating system. For example, operation of extended memory controller 16 is initiated by the operating system and proceeds to automatically control memories 10 and 12 to provide different storage operations and transfer functions to transfer data between a number of consecutive locations in memory 10 and a location in extended memory 12. Processor 14 and extended memory controller 16 each may continue independently executing different programs for controlling the execution of parts of programs during multiprogrammed data processing system operation.

Figure 2:
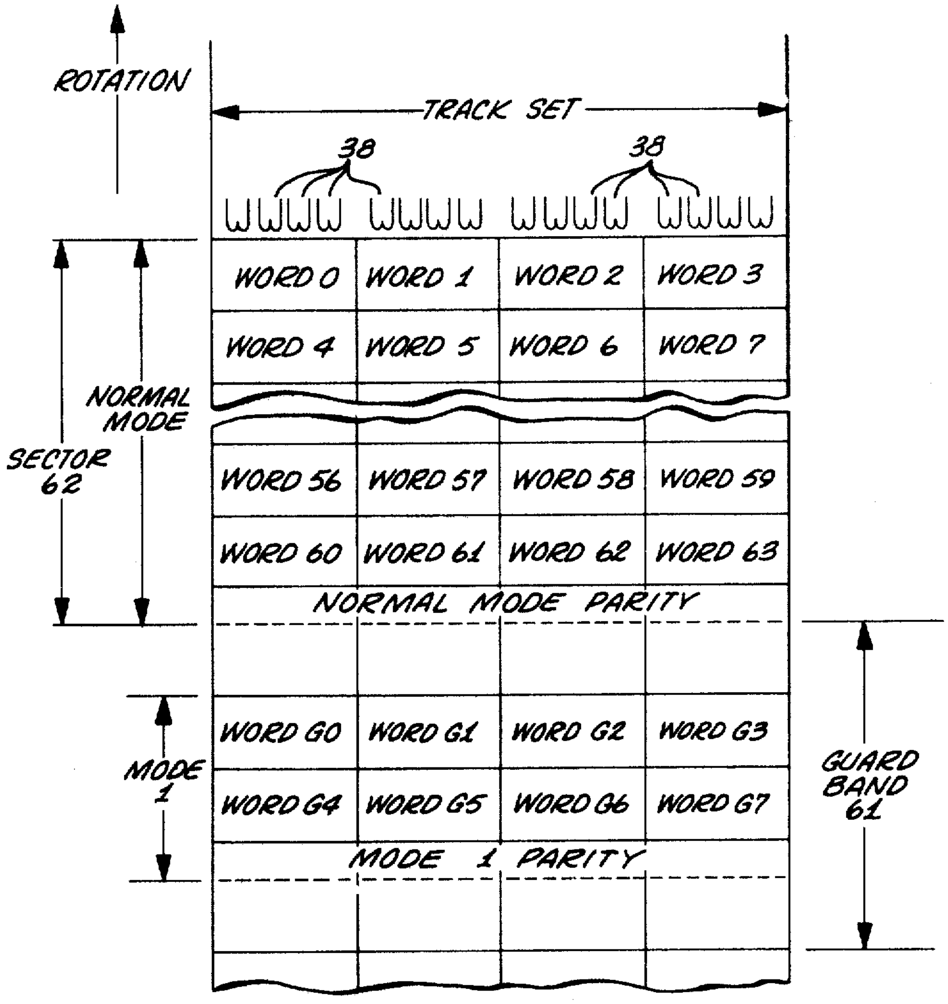
FIG. 2 is a representation of the data words stored in the sectors and guard bands of the auxiliary store employed in the system of FIG. 1.
Figure 4:
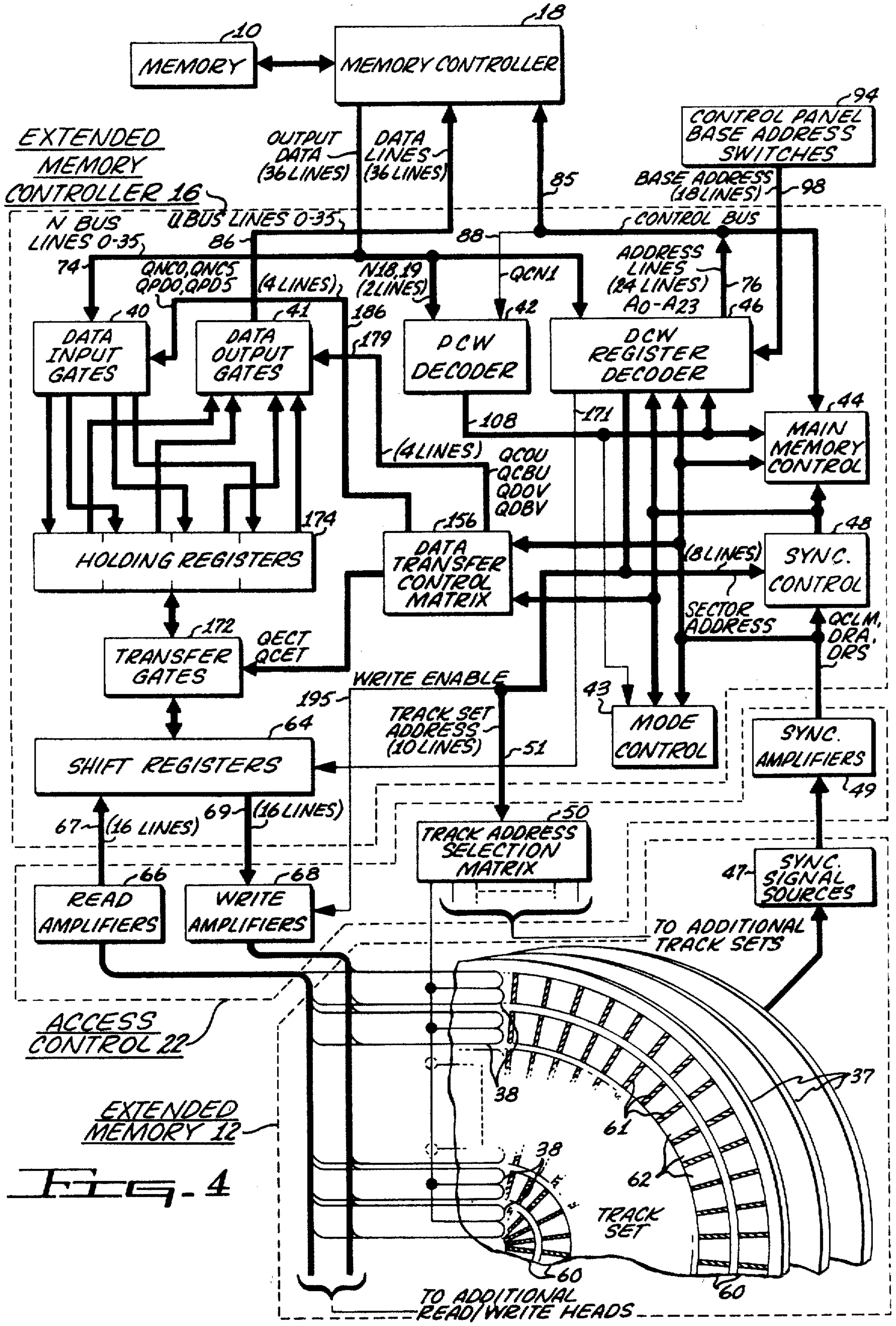
FIG. 4 is a block diagram illustrating in detail the instant invention.

In the data processing system illustrated in FIG. 1, extended memory 12 comprises a circulatable storage member having a peripheral surface which may, by way of example, have magnetic storage characteristics with a plurality of circumferentially disposed sectors 62 and a plurality of circumferentially disposed guard bands 61 for storing information. The circumferentially disposed sectors and guard bands are illustrated as being equiangular sectors designated as 1 through N and equiangular guard bands 1 through N respectively around an axis of circulation. Each guard band may be, for example, as illustrated, interspersed between adjacent sectors and have a length which is short relative to the length of a sector. The surface may comprise discrete circumferential storage tracks 60. The storage tracks 60 as thus provided extend continuously around the extended memory periphery and are used in the N equiangular sectors and guard bands. Thus, each sector along a track is of equal length and each guard band along a track is of equal length. The N sectors and N guard bands each comprise a circumferentially disposed area whose sides are formed along radial extensions from the center of a peripheral surface of the circulatable storage member. Conventional electromagnetic read/write heads 38, FIGS. 2 and 4, are disposed adjacent the tracks in each sector and guard band as the sector and guard bands circulate into a predetermined angular relationship to the read/write heads. Associated with the circulatable storage member and providing a series of synchronization signals in synchronism with the circulation of extended memory 12 is a timing signal source. The timing signal source provides signals by means of lines in cable 40 through access control 22 and through lines of cable 20 to extended memory controller 16 representing the beginning and end of each sector.

A preferred organizatiton of the stored information in a sector and a guard band of 16 tracks, accessed simultaneously as a track set, FIG. 2 provides for storing information which is for example, in the form of fixed length items in each sector and guard band. As represented, 16 read/write heads 38 of a track set are located in parallel across 16 tracks and addressed in parallel to obtain access to information stored in a sector and guard band.

In one form of the present invention, the information stored or retrieved is, for example, in the form of blocks containing a predetermined number of words such as, for example, 64 words shown as words 0—63 in each of sectors 62 and items containing a predetermined number of words such as, for example, 8 words shown as words G0–G7 in each of guard bands 61. Each word contains 36 bits of information. Each sector is effectively divided into a plurality of word spaces.

In a preferred embodiment of the invention, a total of 64 words are arranged to appear within the limits of each sector along the combined lengths of 16 parallel tracks of a track set. A total of 8 words are arranged to appear within the limits of each guard band along the combined lengths of 16 parallel tracks of a track set. It is also within the time that this guard band area rotates through a predetermined angular relationship to a read and write head that an address is presented for comparison with an address corresponding to the next sector or guard band that is to pass under the read/write heads. Also, the necessary track set address switching and changing from reading to writing or writing to reading is accomplished within the guard band time interval between sectors.

Memory 10 comprises memory storage cells 24, and address register 26 and a memory data transfer and control unit 28. Memory storage cells 24 are adapted to store a plurality of data words or instructions in a corresponding plurality of memory storage cells, each such cell storing one data word, one instruction or one control word. Each memory storage cell is designated by an address. An address register 26 stores the address of one of these memory cells. Memory transfer and control unit 28 retrieves the contents of or stores a data word, instruction word or control word in the cell addressed by register 26. To provide its functions, a control unit 28 delivers signals on control lines 30 to control the retrieval or storage functions with respect to the particular memory location designated by address register 26. The address stored in register 26 is communicated to memory storage cells 24 over control lines 32. Data lines 36 illustrate paths provided for data word, instruction and control word storage into memory storage cells 24. Data lines 34 illustrate the path provided for data work, instruction and control words retrieved from memory storage cells 24.

In normal operation of the system sets of the memory cells are reserved for the storage of data control words and instruction words which control the sequence of transfer operations to be performed by the system. The data control word comprises two 36 bit words having four portions as previously described, and will hereinafter be referred to as a "DCW."

The present invention is directed to increasing the storage capacity of the extended memory 12 of a multiprogrammed data processing system of FIG. 1 and in providing for testing the addressing of all sectors and guard bands of extended memory 12. The present invention is also directed to testing, reading and writing operations at locations in true relationship to all addressable locations and for transferring information between memory 10 and extended memory 12. Accordingly, the description of the operation of the invention will be directed to the operation of the system in separate modes of operation for accessing sectors and guard bands of extended memory 12, to the operation of the system during the transferring of information between memory 10 and extended memory 12, and to the testing of extended memory 12 and access control 22.

There will now be provided a summary description of the operation of a portion of the system of FIG. 1 when the operating system specifies that communication is to be made between memory 10 and extended memory controller 16. One instance when such communication is required is when all or a portion of a subject program, which is not in memory 10, must be executed. Extended memory 12 contains the subject programs which are not currently in use but are required for early execution. These programs are requested by the operating system. The data words comprising a subject program in extended memory 12 must be moved into available space in memory 10 before it may be accessed by a processor or controller for execution. Processor 14, upon executing a particular type of instruction, termed a "connect," instruction of the operating system programs requests information not currently in memory 10. When the processor executes the particular type of instruction, a signal is generated and applied to memory controller 18 to initiate a storage retrieval operation for retrieving a particular type of control word termed a "peripheral control word," hereinafter referred to as a "PCW" from memory 10 and delivering the PCW to extended memory controller 16.

The control words are stored in memory 10 by the operating system programs. The operating system programs also provide the "connect" instruction to processor 14 which executes the instruction by providing control signals to memory controller 18. Memory controller 18 responds to the control signals to provide for retrieval of the "PCW" from memory 10 and to deliver the PCW to extended memory controller 16. Controller 16 responds to the "PCW" to initiate an information transfer between memory 10 and extended memory 12. If the PCW delivered to controller 16, upon execution of the aforementioned connect instruction contains a "start," retrieve data control word operation portion, controller 16 must start an operation to control information transfer functions between extended memory 12 and memory 10, the information transfer function to be provided as determined by retrieving the contents of two successive locations in memory 10, utilizing an address supplied by the PCW. The data words in these two locations are the first one of a succession of DCW's.

Extended memory controller 16 controls memory controller 18 to retrieve a first DCW as a result of providing a request for access to memory 10 by applying an access request signal to memory controller 18. Assuming that controller 16 is given access to memory 10 by controller 18, controller 16 then sends address and control signals specifying a read type of operation by memory 10 through controller 18. Memory 10 responds to the control signals to perform a read operation for reading a DCW out of the two memory locations specified by the address signals and transfers the DCW to memory controller 18. Memory controller 18 then transmits a first DCW, one word at a time, to extended memory controller 16, where the DCW is stored. Controller 16 responds to the DCW to provide for the subsequent establishment of a specified mode of operation and a retrieval operation for retrieving a next DCW. Controller 16 responds to the next DCW and the mode of operation established by the first DCW to provide for the subsequent type of information transfer function and to control a particular type of storage operation of main and extended memories as specified by a portion of the retrieved DCW.

Each DCW contains a function portion which determines whether the DCW specifies a particular mode of operation or a type of transfer function to be controlled by controller 16. Controller 16 responds to a function portion of a DCW representing a particular mode of operation to store a portion of the function portion termed "mode control information" and immediately initiates a retrieval operation for retrieving a next DCW by requesting access to memory 10 through memory controller 18. Memory controller 18 responds to an access request, address, and control signals from controller 16 to provide for a second retrieval of a DCW from memory 10 and transfer the DCW to extended memory controller 16. Controller 16 responds to the stored "mode control information" and the function portion of the next DCW representing a type of transfer operation to control the type of information transfer, such as the direction of information transfer between memory 10 and extended memory 12.

Controller 16 responds to the stored function portion of a DCW specifiying a mode of operation and the function portion of each next DCW containing a function portion specifying a transfer operation to provide for a storage operation at a sector location in extended memory 12 if a "Normal Mode" of operation is specified. If a "Mode 1" operation is specified, the storage operation is performed at a guard band location. Controller 16 responds to the function portion of a DCW representing a transfer operation to transmit control signals to memory 10 and access control 22 to control the type of storage operation of each memory such as retrieval or storage which are to be referred to hereinafter as read or write operations respectively. If the controller 16 has responded to the function portions of DCW's to provide read or write operations in a Normal Mode of operation, the read and write operations are performed at a specified sector of extended memory 12 with operation continuing to utilize sector locations until a DCW is received which specifies a change in the mode of operation. When the next DCW is received which specifies a change in mode of operation from the Normal Mode to Mode 1, the extended memory controller stores the function portion representing Mode 1 and retrieves a next DCW which is utilized to begin the performance of the type of transfer operation specified by the next DCW. Successive DCW's may therefore specify a change in the type of operation to be performed and whether sectors or guard bands in the extended memory are to be accessed.

If two successive DCW's specify a Normal Mode of operation and that information is to be transferred from memory 10 to extended memory 12, the extended memory controller 16 sends an access request, address signals, and control signals specifying a read function to memory controller 18. Controller 16 also sends a control signal specifying a write operation accompanied by address signals to access control 22. Memory controller 18 then initiates a read operation in memory 10 for retrieving four data words from four consecutively addressed locations commencing with the location specified by the main memory address in the DCW stored in controller 16. These four data words are transferred, one word at a time, to extended memory controller 16. Controller 16 then tranfers the four data words to extended memory 12 which writes the four words into the sector specified by the address supplied by the DCW during a Normal Mode of operation. Controller 16 contains sufficient buffer storage to store four data words being transferred between controller 18 and extended memory 12. While the data words are being written in extended memory 12, controller 16 initiates another retrieval operation to retrieve another four words from main memory locations adjacent to locations from which the preceding four words were retrieved. This sequence of operations is repeated until a predetermined number of words, such as 64 data words during Normal Mode of operation, have been transferred from 64 consecutively addressed locations in memory 10 and stored in a 64 word capacity sector of extended memory 12.

Extended memory controller 16 automatically terminates the writing operation when 64 words have been written into the addressed sector of extended memory 12 in response to receiving an end of sector signal provided by extended memory 12.

If two successive DCW's specify a Mode 1 operation and that information is to be transferred from memory 10 to extended memory 12, eight data words are retrieved from memory 10 and stored in a guard band specified by the sector address supplied by the DCW. The retrieval of four words at a time from memory 10 for storage in extended memory 12 is performed as previously described for a Normal Mode of operation. Extended memory controller 16 responds to the end of sector signal and stored mode control information previously described, to generate a start guard band signal for use in initiating the writing operation in the guard band imediately following the sector corresponding to the sector address and automatically terminates the writing operation when 8 words have been written into the guard band.

Extended memory controller 16 therefore utilizes the same sector address supplied by a DCW in conjunction with the stored mode control information and the end of sector signal to control writing in either a sector or a guard band.

At the completion of the writing operation, extended memory controller 16 sends an access request and address signals representing the address where the next DCW is located in memory 10 as denoted by the current DCW and control signals specifying a retrieval storage function to memory controller 18. Memory controller 18 responds by controlling memory 10 for reading and transferring the next DCW to extended memory controller 18. Controller 18 then controls the storage operations of both the main and extended memories and the transfer of information between memories as specified by the new DCW.

A read operation specified by a DCW following receiving of a DCW which specifies a particular mode of operation is executed by extended memory controller 16 in a manner similar to the preceding description for a write operation. During a Normal Mode operation, 64 data words are retrieved from extended memory 12 and transferred for storage in memory 10. For a Mode 1 operation, 8 data words are retrieved from extended memory 12 from a specified guard band and transmitted for storage in memory 10.

Extended memory controller 16 utilizes the same sector address supplied by a DCW to provide control signals to gain access either to the sector corresponding to the sector address or the guard band immediately following the sector corresponding to the sector address. The sectors provide spaces unaccessible when the acess control is accessing guard bands in succession during Mode 1 operation and the guard bands provide spaces unaccessible when the access control is accessing sectors in succession during Normal Mode operation. By reserving the sectors for storing information for use by the data processor in normal processing operations and using the guard bands for storing information for testing the operability of the access means in communicating with corresponding sectors, it is possible to test or exercise the extended memory by addressing all guard bands with all possible sector address sequences. It is also possible to test every guard band with every information word that might conceivably be written into and read out of a sector. Since the access to sectors is separate from access to the guard bands as determined by the mode of operation, no alteration or destruction of information for use by the processor in normal processing operations is encountered due to operations involving test information in the guard bands. Testing is therefore provided at locations having a true relationship to the location of each addressable sector of a track.

The data processing system of FIG. 1 processes information represented by the binary code. With the binary code, each element of information is represented by a binary digit, sometimes termed a bit, each binary digit being either a 1 or a 0. The unit of information primarily employed in processing is termed the data word and also sometimes termed a computer word. The data word in the system of FIG. 1 comprises 36 bits. Four types of data words are employed in this system: instruction words, operand words and two types of control words.

The operand word is a data word on which an arithmetic or logical operation is performed by processors 10 or 12 which is the result of a data processing operation performed by a processor. Thus, the operand word represents information which is to be processed and which is received from a memory by a processor and information which is the result of processing and which is transmitted to a memory by a processor.

The instruction word is employed to direct a discrete step in the data processing operation being executed by a processor. The instruction word is received from a memory by a processor.

The two types of control words are designated as peripheral control words (PCW's) and data control words (DCW's). A PCW (FIG. 3) is composed of 36 binary digits of information. The first 18 bits of the PCW designated as bits 0–17 provide a binary number representing the address of the first location of two successive locations in memory 10 containing the first of a succession of DCW's. Two bits designated as bits 18 and 19 provide a code specifying the type of operation to be performed by extended memory controller and three bits 33–35 are utilized by the memory controller and string the PCW to the extended memory controller. The PCW also has thirteen spare bits.

If the PCW bits 18 and 19 are both binary 0's, an emergency disconnect operation is specified and the extended memory controller immediately halts any operation process. The emergency disconnect operation is effective only when the extended memory controller is transferring information, which is referred to as the busy state. If bit 18 is a binary 0 and bit 19 is a binary 1, the extended memory controller 18 performs a housekeeping operation, an understanding of which is not material to an understanding of the invention. If bit 18 is a binary 1, a "start retrieve data control word" operation for retrieving a DCW from memory 10 is specified.

A pair of words representing a DCW, FIG. 3, designated as DCW1 and DCW2 hereinafter, are each composed of 36 binary coded bits of information. The first indicated 18 bits of DCW1, designated bits 0–17, provide an address representing a track and sector address in extended memory 12 and 18 bits designated 18–35 provide the beginning address referred to as "data address" in memory 10 between the locations being adapted to store information which is to be transferred. DCW2 contains 36 bits, 18 bits designated 0–17 provide the main memory address of a location in memory 10 containing the DCW1 of the next DCW pair (the address of location containing DCW1 is hereinafter referred to as the link address to the next DCW in a succession of DCW's). DCW2 also contains 5 bits designated 18–22 providing a function code to specify the mode of operation in which controller 16 is to operate for accessing locations in extended memory 12. The function code also specifies the type of operation to be performed by extended memory 12 during an information transfer or whether a current storage operation and associated transfer function in progress is to be terminated by a disconnect operation as shown in the following table:

| Code: | Type of operation |
|---|---|
| 10001 | Normal mode. |
| 11001 | Mode 1. |
| 00000 | Disconnect. |
| 11000 | Read. |
| 11010 | Write. |

One bit designated as bit 23 provides for control of an operation, an understanding of which is not material to an understanding of this invention. DCW2 also has 12 spare bits.

A summary description of the extended memory controller 16, FIG. 4, will now be provided. During its operation the extended memory controller is always in one of two phases, either the "retrieve data control word" cycle or the control cycle for controlling execution of a DCW. In the retrieve data control word cycle, the extended memory controller retrieves a DCW from two successive storage locations in working store 10, transfers the function portion of the DCW to a DCW register decoder 46 and senses the function to be controlled, determines the type of storage operation to be executed, the mode of operation and the next cycle to be entered. Decoder 46 responds to the function code to generate a corresponding function signal. In the control cycle, extended memory controller responds to the function signal to provide for either terminating an operation in process for changing the mode of operation to accessing sectors or guard bands in extended memory 12, or for controlling a particular type of transfer function for receiving or transmitting data in a specified direction. The extended memory controller also responds to the function signal to generate storage control signals which are applied to memory controller 18 and access control 22 to control the particular type of storage operations to be provided.

The particular type of operation or mode of operation is determined by one of five function and mode control signals which are presented at the output of decoder 46, namely DIS, RDY, WRY, CNO and F1 corresponding to the previously described disconnect, read, write, Normal Mode and Mode 1 operations respectively. These signals are provided in accordance with the binary configuration of the states of five flip-flops of a register designated as the F register in decoder 46.

During initialization of operation, extended memory controller 16 receives a PCW from memory 10 as a result of a memory controller responding to a processor executing a connect instruction. Output data lines identified as N bus 74 provide 36 lines, designated as (0–35), are connected between memory controller 18 and extended memory controller 16 to provide an information transfer path from controller 18 to controller 16. N bus 74 supplies bits 18 and 19 of the peripheral control word to a PCW decoder 42 and the address portion of the PCW (bits 0–17) for storage in a register of DCW register decoder 46. Decoder 42 also receives a signal designated as QCN1 on a line 88, to be described hereinafter, from memory controller 18 to enable decoding bits 18 and 19 to determine what operation is to be performed by extended memory controller 16.

Assuming that decoder bits 18 and 19 specify that a "start," retrieve data control word operation is to be performed, decoder 42 provides a control signal resulting from decoding bits 18 and 19 to a main memory control 44. Control 44 then applies a request for access, a command code specifying a main memory retrieval operation and the address of a pair of DCW's to memory controller 18 on lines within cable 85 which is designated as the control bus interconnecting controllers 18 and 16. Memory controller 18 responds by retrieving and transmitting a DCW applied one word at a time to N bus 74 for transfer into decoder 46 in response to control signals from main memory control 44.

DCW register decoder 46 decodes the function portion of the DCW representing a mode of operation to store a portion of the function code termed a "mode code" and to initiate retrieval of a next DCW by controlling memory 10 to transfer a next DCW to decoder 46. Decoder 46 decodes the function portion of a DCW representing a transfer operation to provide control signals for controlling memory 10 and extended memory 12 to affect a specified information transfer between memories. Control signals from decoder 46 are provided to main memory control 44, synchronization control 48, write amplifier 68, track address selection matrix 50 and data transfer control matrix 156, and mode control 43. Mode control 43 responds to a RDY, WRY, CNO and F1 signals to provide mode control signals to be described hereinafter. The mode control signals are applied to main memory control 44, to DCW register decoder 46, to synchronization control 48 and to data transfer control matrix 156 for controlling the transfer of information during mode 1 operation. Main memory control 44 responds to a RWY, WRY function signal to provide a command code and other control signals to be described hereinafter to memory controller 18 on control bus 85 and control signals to decoder 46 to control applying the address of information to be transferred to control bus 85 and subsequently to memory controller 18. The control signals applied to synchronization control 48 comprise an extended memory sector address which is compared with sector address signals supplied from access control 22 until comparison is achieved indicating that the addressed location is available for access. The control signals applied to track selection matrix 50 comprise a track set address for activating 16 read/write heads simultaneously.

If a DCW received by DCW register decoder 46 contains a function code representing a mode of operation, decoder 46 supplies a CNO signal and an F1 signal to mode control 43. Mode control 43 responds to the CNO and F1 signals to store a mode code. The CNO signal is also applied to main memory control 44 for controlling main memory control 44 to provide control signals for retrieving the next DCW from memory 10. The next DCW is received and stored in DCW decoder 46. Decoder 46 decodes the function code and provides either a RDY or WRY function signal as previously described.

If the mode code stored in mode control 43 represents a Normal Mode or Mode 1 operation, the RDY and WRY signals are applied to synchronization control 48, main memory control 44, data transfer code matrix 156 and mode control 43. If the mode code stored represents a Mode 1 operation, the RDY or WRY signals are decoded further by mode control 43 to generate additional control signals which are applied with the RDY and WRY signals to synchronization control 48, data transfer control matrix 156, and main memory control 44 to provide further control during Mode 1 read and write operations respectively. Following the retrieval of a DCW specifying a mode control operation and a DCW specifying a transfer function, the extended memory sector address is compared with the sector address signals supplied from access control 22 until comparison is equal indicating that the addressed location is available for access.

While address comparison is being performed by synchronization control 48, main memory control 44 has provided signals which in the case of a write operation have provided for retrieval and transfer of four 36 bit words from four consecutive locations of memory 10. The four words are transferred one word at a time into holding registers 174 since N bus 74 provides only 36 lines for transfer of one 36 bit word at a time. Four sets of 36 gates within data input gates 40 are enabled selectively by four signals from data transfer control matrix 156 to enter 36 bits successively into a first, second, third and fourth 36 bit holding register. In the case of a read operation, no main memory information transfer is performed until after address comparison. For a write operation, upon obtaining sector address comparison, holding registers 174 contain contents which are transferred in parallel to transfer gates 172 in response to a control signal applied to transfer gates 172 from data transfer control matrix 156 into shift register 64.

For a read or write operation following address comparison, main memory control 44 provides shift signals to each of the 16 nine bit character shift registers beginning at the proper time, to permit shifting information bits serially from each shift register to write amplifier 68 or from read amplifier 66 into each shift register at the bit time reading or writing rate of extended memory 12. After nine shift signals the shift registers 64, which are comprised of sixteen 9 bit registers, are either filled with 16 characters which have been read or are empty and need refilling with 16 new characters to write during the next nine shift signals.

During a read operation main memory control 44 provides for parallel transfer of the contents of shift register 64 to holding register 174 and subsequent application to memory controller 18 along with command, address and timing signals to provide for a storage operation of four words in memory 10 following every nine shift signals. During every nine shift signals provided while performing a write operation, four new 36 bit words are retrieved from memory 10, transferred in parallel into holding registers 174 and then into shift registers 64 before applying the first of the next eight shift signals during a write operation. Main memory control 44 provides for automatically incrementing the address applied to memory controller 18 such that words are stored in or retrieved from a block of 64 main memory locations whose addresses are consecutive during a Normal Mode operation. During a Mode 1 operation, main memory control 44 provides for incrementing the address as previously described such that words are stored in or retrieved from an item of 8 main memory locations whose addresses are consecutive.

In the case of a Normal Mode of operation, the control of a read or write operation continues until an end sector signal is received by extended memory controller 16 from mode control 43. When the end sector signal is received, main memory control 44 discontinues the supply of shift signals to sixteen 9 bit character shift registers and provides control signals for initiating a retrieval of the next DCW pair from the main memory utilizing the main memory address of the next DCW supplied by the DCW portion designated as the link address and previously stored in the DCW register decoder 46.

In a Mode 1 operation, the control of a read or write operation starts when a start guard band signal is received by the extended memory controller from mode control 43. When the end sector signal is received, mode control 43 provides an operation which simulates delaying the end sector signal for nine shift signal times to generate a start guard band signal and commences the read or write operation in response to a start guard band signal. The read and write operations for Mode 1 operation are performed nine shift signals following the receiving of an end sector signal such that the read or write operation is performed in a guard band immediately following sector addressed by the extended memory address in a DCW.

During a read operation main memory control 44 provides for a parallel transfer of the contents of shift registers 64 to holding registers 174 and subsequent application to memory controller 18 along with command, address and control signals to provide for a storage operation of four words into memory 10 following every nine shift signals. During every nine shift signals provided for performing a write operation, four new 36 bit words are retrieved from memory 10, transferred into four 36 bit registers of holding registers 174 and then transferred in parallel into sixteen 9 bit shift registers 64 before applying the first of the next eight shift signals during a write operation. Main memory control 44 provides for automatically incrementing the address applied to memory controller 18 such that words are stored in or retrieved from a section of eight main memory locations whose addresses are consecutive. The control of a read or write operation continues until eight words are stored in or read from extended memory 12. When the eight words are stored in or retrieved from extended memory 12, main memory control 44 discontinues the supply of shift signals to the 16 nine bit character shift registers and provides control signals for initiating a retrieval of the next DCW from the main memory utilizing the main memory address of the next DCW supplied by the DCW portion designated as the link address and previously stored in a register of DCW register decoder 46.

A detailed description will now be given of the structure of the main components and signals as shown in FIGS. 5–10.

Data control word addressing in the storage system of the described embodiment is relative addressing, which is well-known in the art. Relative addressing is the employment of memory addresses which are not the identity of the exact memory locations, but are only relative to a referenced location. The reference location is determined by the operating system when the program or DCW's are loaded into main memory. Relative addressing is a technique applied in multiprogramming for optimizing the location of data words in memory 10. In this manner, the DCW's can be located in a portion of the working store, with each of the relative addresses being directed to that specific portion of memory, through the use of base addresses which will be described hereinafter.

The following conventions in terminology and notation are to be followed in the drawings, and the following description. It will be noted in the drawings that there are wide connecting lines and narrow connecting lines. A wide connecting line indicates a number of conductors or a cable of conductors, whereas a narrow connecting line indicates a single conductor. Extended memory controller logic blocks are made up of conventional storage and shift registers, counters, flip-flops, OR-gates, AND-gates, inverters, comparators, pulse distributors, decoders, encoders and control matrices, which are well-known in the art and which operate in a normal manner. The extended memory controller logic blocks will be described in detail hereinafter.

The term "control matrix" as used in the following description comprises a set of gates provided to route logic signals, hereinafter referred to a binary 1 signals or binary 0 signals throughout the extended memory controller. For example, the control matrix consists of OR and AND-gates, certain of which will be enabled when the given output line from a decoder is present as an input together with a timing signal to provide outputs for sequencing operation. The control matrix must therefore control the distribution of signals in a timed sequence to correct points throughout the machine in response to the receiving of certain time related signals and certain decoded control signals.

In the description hereinafter the term "read" is used to specify an operation of retrieving information from extended memory 12 and transferring the information to memory 10 for storage. The term "write" is used to specify an operation of retrieving information from memory 10 and transferring the information to extended memory 12 for storage.

Memory controller 18 may be of a type disclosed in copending patent application by David L. Bahrs et al., entitled "Intercommunicating Multiple Data Processing System," assigned to the General Electric Company and bearing the Ser. No. 555,491 and filed on June 6, 1966.

The signal conductors which couple together the major components of memory controller 18 and extended memory controller 16 are illustrated in FIG. 4. Operation of memory controller 18 is disclosed in the aforementioned Bahrs et al. copending patent application. Memory controller 18, in the following description, provides access to memory 10 by extended memory controller 16.

Processor 14 may be of a type disclosed in the aforementioned Bahrs et al. copending patent application. Processor 14 is coupled to memory controller 18 to provide the communication signals, to be described hereinafter in the detailed description of extended memory controller as required for retrieval and storage information in memory 10 under control of operating system programs which are stored in memory 10.

Memory 10 has been previously described with reference to FIG. 1. One form of memory suitable for employment as memory 10 is the coincidence current magnetic core type of random access memory well-known in the art. Memory 10 is of the well-known double precision type wherein two words in two locations with consecutive addresses are addressed simultaneously with one even numbered address and the two words are transferred to memory controller 18 successively one word at a time during a double precision memory cycle time. For example, the address of an even numbered location will automatically address the even numbered location and the next higher numbered odd location, such as locations 100 and 101. During a double precision memory cycle time, two words may be stored or retrieved in any two memory locations with consecutive numbered addresses, where the first location has an even numbered address.

Memory 10 as illustrated in FIG. 1, may have various capacities for storage. One memory which may, for example, be employed with the instant invention has capacity for storing approximately 32,000 data words, each word comprised of 36 binary digits. Each binary digit of a word is stored in a corresponding magnetic core. The location of a particular word is identified by a number stored in address register 26 and a particular word is retrieved from or entered into memory storage cells 24 at the location identified by the contents of address register 26. Memory storage cells 24 store information words including instruction words, operand words and control words at any random address cell or in groups of memory cells. As the term is used herein, random access pertains to the process of obtaining data from or placing data into storage, where the time required for such access is independent of the cell of the information most recently obtained or placed in storage.

Each DCW currently arranged for execution in a specific order by the operating system is located, for example, in a set of cells with consecutive addresses as illustrated in the memory map of FIG. 1. Since each DCW contains the address of the next DCW, a string of randomly located DCW's can be linked together. The particular memory 10 employed with the present invention has a memory cycle time of one microsecond, during which time two words may be stored or retrieved. The DCW is stored at two memory cells with consecutive addresses where the first location has an even numbered address while other program information words to be transferred are stored in groups of cells whose addresses are consecutive. In the illustrated embodiment of FIG. 4, during Normal Mode of operation, words are transferred from extended memory 12 in blocks of 64 words to be stored in 64 main memory locations whose addresses are consecutive. Words transferred in the opposite direction of transfer are retrieved from 64 main memory locations, whose addresses are consecutive, for transfer to extended memory 12 in the Normal Mode of operation. During Mode 1 operation, words are transferred from extended memory 12 in items of eight words to be stored in eight main memory locations whose addresses are consecutive. Also, during Mode 1 operation, words are transferred in the opposite direction of transfer and are retrieved from 8 main memory locations, whose addresses are consecutive, for transfer to extended memory 12.

Control of memory controller 18 and extended memory 12 by extended memory controller 16 requires certain distinct communication signals. The cables providing communication and data transfer paths between extended memory 12 and memory controller 18 are illustrated in FIG. 1 by interconnecting line 17. Interconnecting line 17 symbolically represents a cable, thus N bus 74, U bus 86 and control bus 85 of FIG. 4 are represented by line 17 in FIG. 1.

Information, address and control signals which are transmitted between memory controller 18 and extended memory controller 16 are as designated in FIGS. 4, 5, 7, and 8. In the illustrated embodiment the interconnecting conductors providing communication paths between extended memory controller 16 and memory controller 18 are all contained within N bus 74, U bus 86 and control bus 85 as illustrated in FIG. 4. All information is transferred as 36 bit words on 36 data lines of U bus 86 and 36 output data lines of N bus 74 as shown.

The N and U buses communicate selectively through data input gates 40 and data output gates 41 with four 36 bit registers designated as holding registers 174, and other logic blocks of extended memory controller 16. The U bus provides data for transfer to memory controller 18 from the four 36 bit registers of holding registers 174. The N bus receives the output of the memory controller and applies these output signals directly to PCW decoder 42 (bits 18 and 19) and selectively into the four 36 bit registers of holding register 174 and selectively into registers of DCW register decoder 46.

Figure 5:
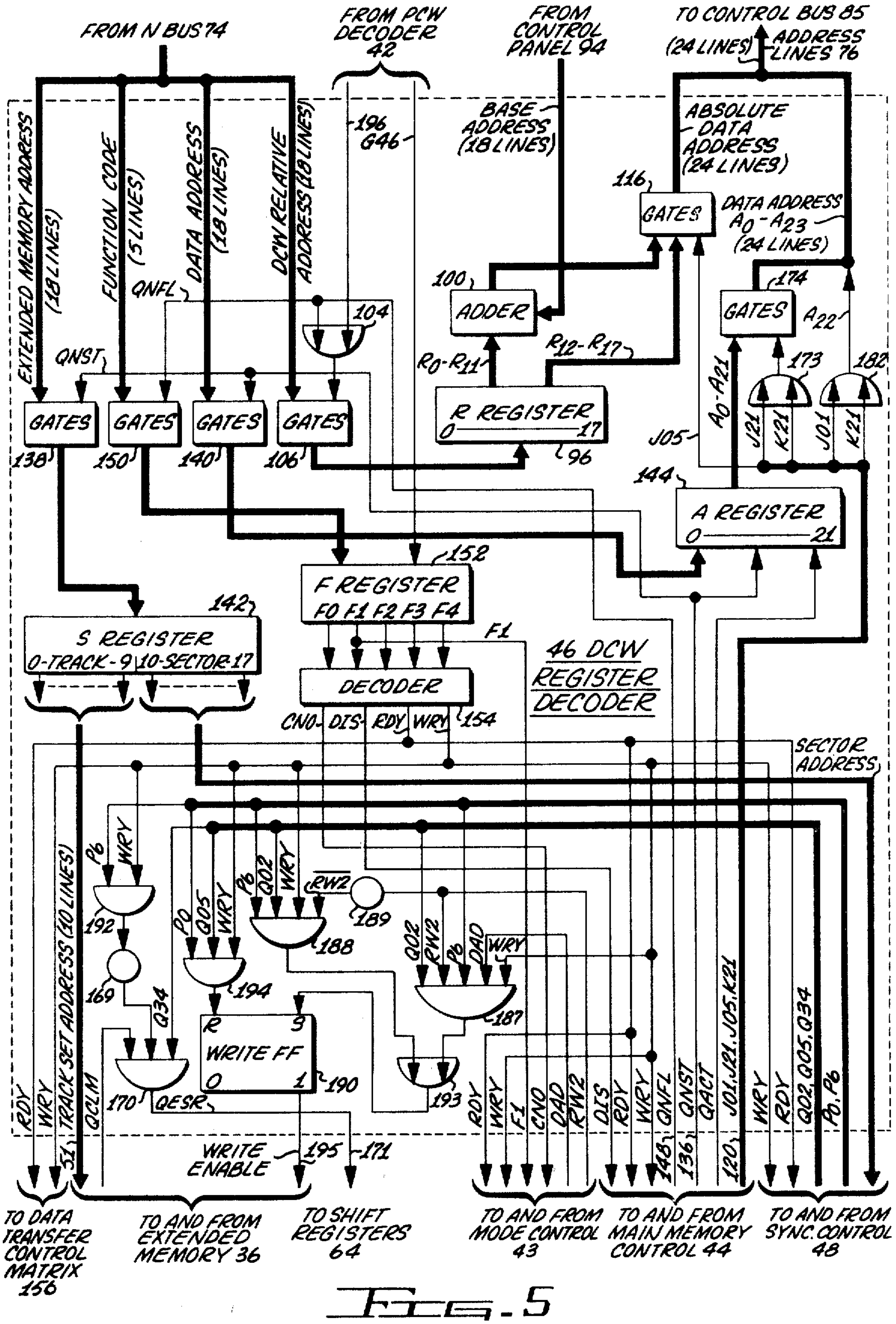
FIG. 5 is a block diagram of the DCW register decoder of FIG. 4.
Figure 7:
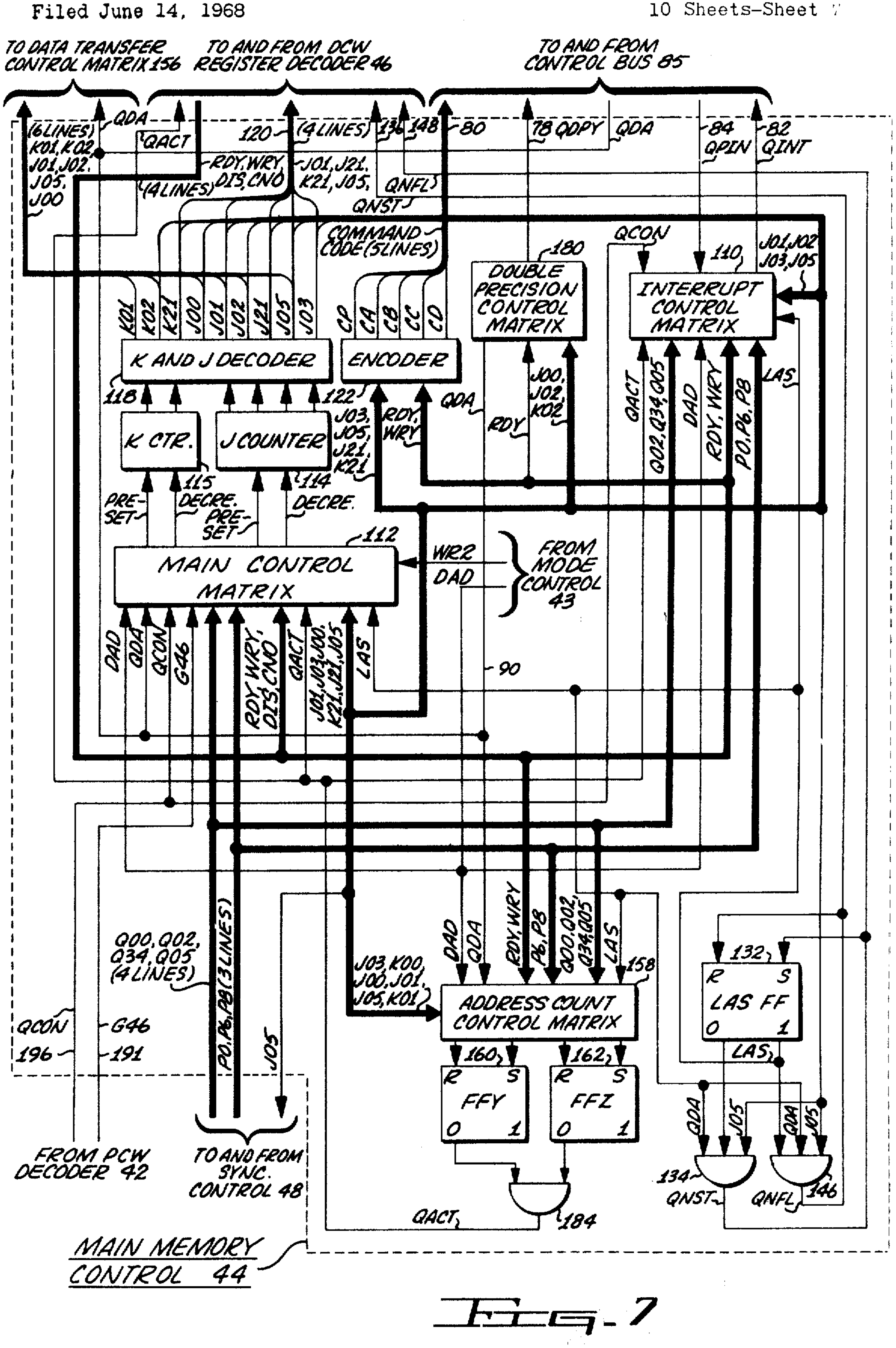
FIG. 7 is a block diagram of the main memory control of FIG. 3.

The N and U buses are each connected to data input gates 40 and data output gates 41 respectively. Gates 40 are each comprised of a plurality of gates for selectively controlling the transfer of 36 bit words, one word at a time, into different ones of four 36 bit registers of holding registers 174. Gates 41 are comprised of a plurality of gates for selectively controlling the transfer of 36 bit words, one word at a time, out of different ones of the four 36 bit registers. Data input gates 40, transfer one word therethrough in response to each of the four designated signals on lines 186, while data output gates 141 respond to each of the four designated signals on lines 179. FIGS. 5 and 7 illustrate in detail the logic blocks of DCW register decoder 46 and main memory control 44. In these figures the control signals which are transmitted and received through control bus 85 are identified. The N bus lines are also selectively connected to the A, F, R and S registers of DCW register decoder 46 through gates 140, 150, 106 and 138 respectively, in response to signals from main memory control 44.

Control bus 85 provides for receiving and transmitting all control signals, other than information signals between memory controller 18 and extended memory controller 16. Control signals transmitted to memory controller 18 and 24 address signals applied to control bus 85 on 24 lines of cable 76, a five bit binary coded command designated as command code on 5 lines identified by reference numeral 80, a QDPY pulse on line 78, and a QINT pulse on line 82. Control signals received by extended memory controller 16 by means of control bus 85 are a QDA pulse on line 90 and a QPIN pulse on line 94. The control signals identified in the preceding description correspond to the signals designated as addr. lines (18 bits/chan.), CMD code line & Prot. line (5 bits/chan.), DBL. Prec./rewrite line (1 $DP/chan.), Chan. Int. Line $I, $DA, and $PIN in the aforementioned Bahrs et al., copending patent application.

The address applied to memory controller 18 comprises 24 bits. The first bit is termed the least significant bit of the address. The bits between the most and least significant. The entire binary numeric address represents a number of 24 bits. The first bit of the address lines delivered on line $A_0$ as illustrated in FIG. 5 is the most line $A_{23}$ is the least significant bit. The remaining bits are accorded successively decreasing orders of numerical significance, depending on their respective positions between the most and the least significant bits. The 24th bit of the binary numeric address represents $2^0$, the decimal number 1, when the twenty-fourth bit is a binary 1. The twenty-third bit represents $2^1$, the decimal number 2, when the twenty-third bit is a binary 1. The twenty-second bit represents $2^2$, the decimal number 4, when the twenty-second bit is a binary 1.

Address lines of cable 76 provide 24 address signals;

however, only the signals representing the 18 least significant bits are accepted by the memory controller of the illustrated embodiment. Addressing as described hereinafter will be presented utilizing a 24 bit address.

Addresses from DCW register decoder 46 are selectively transferred through gates 116 and 174 to control bus 85 in response to signals on lines 120 from main memory control 44. Gate 182 receives signals on lines 120 to provide a binary 1 signal on address line $A_{22}$ during main memory information transfer operations. This has the effect of incrementing the main memory address by 2 during the transfer of the second 2 words of every 4 word transfer operation with main memory.

Figure 8:
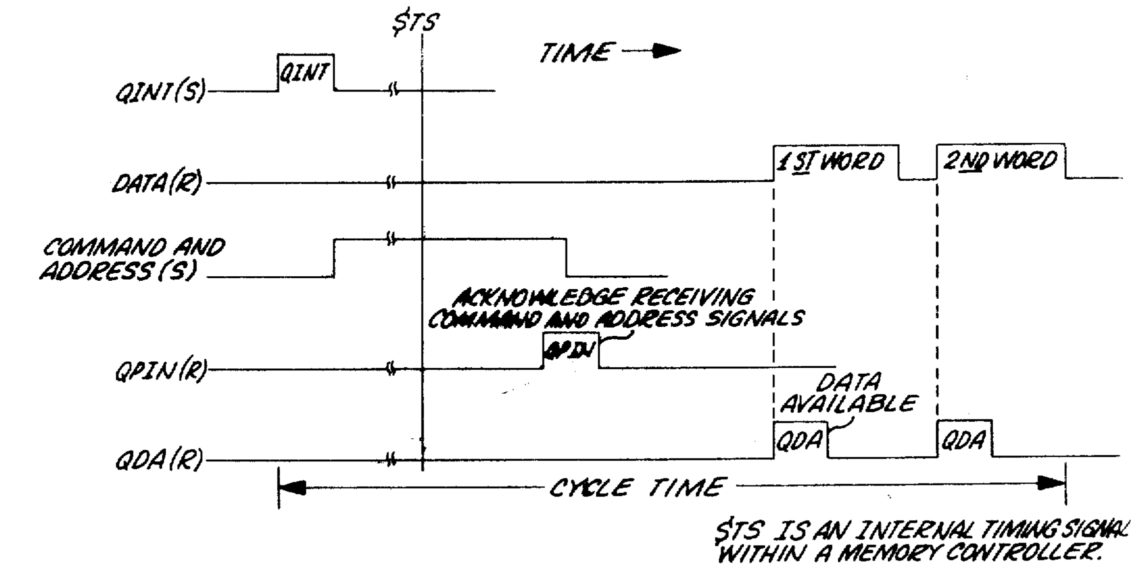
FIG. 8 illustrates waveforms of control signals transmitted between memory controller and extended memory controller.
Figure 8:
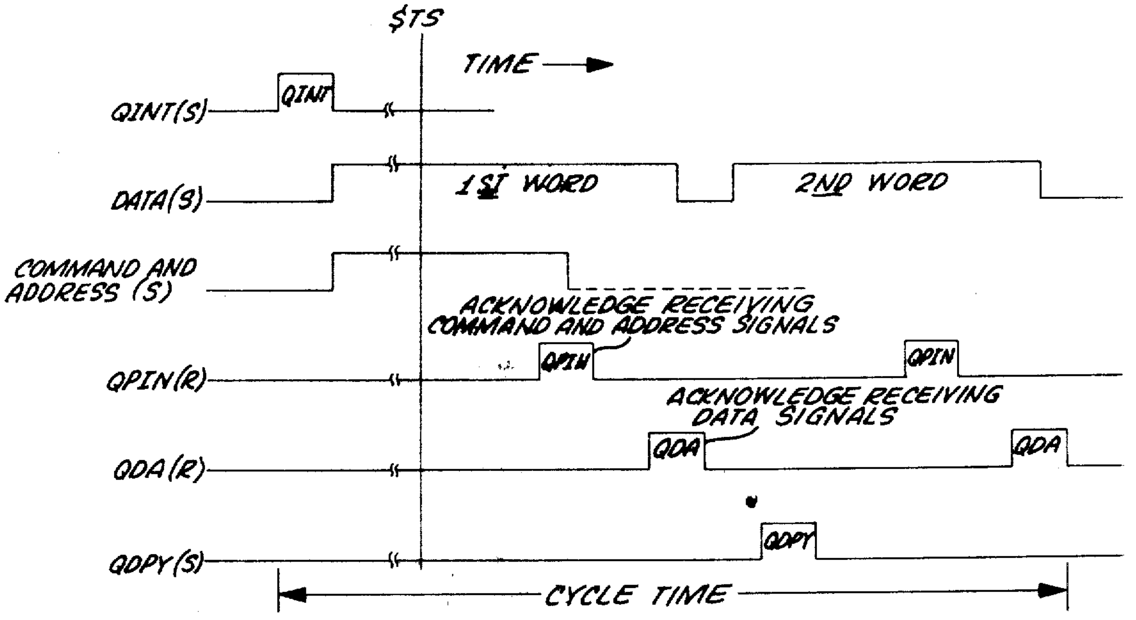

Control bus 85 provides one remaining control signal not described in the preceding description or illustrated in the waveforms of FIG. 8. As shown in FIG. 4, a signal designated QCNI is provided on line 88 of control bus 85. The QCNI signal is supplied by memory controller 18 during operating system initialization of extended memory controller 16 to perform a desired operation. When a QCNI signal is present on line 88 and applied to PCW decoder 42, the PCW supplied on N bus 74 in response to the operating system is decoded. Signals resulting from the decoded PCW either initiate operation of extended memory controller 16 or provide for an emergency disconnect operation to terminate an operation in process as designated by bits 18 and 19 of the PCW.

PCW decoder 102 receives bits 18 and 19 of a PCW from memory controller 18 as provided by N bus 74, lines designated as N 18, 19 in FIG. 4. Bits 18 and 19 are decoded during initiation of the operation of extended memory controller 16 when a QCNI signal is received from memory controller 18 on line 88. The decoded binary configuration provided by bits 18 and 19 may specify one of the operations, shown in the following table, to be performed by extended memory controller 16.

| Bits: 18 | 19 | Operation |
|---|---|---|
| 1<br>0 | 1<br>0 | Emergency Disconnect. |
| 1 | 0 | "Start," Retrieve Data Control Word. |
| 0 | 1 | Housekeeping Operation. |

N bus 74 provides for entry of both PCW's and into extended memory controller 16. Each PCW controls the extended memory controller while each DCW provides for control of main and extended memories. If a housekeeping operation is specified by bits 18 and 19 of a PCW, an operation not material to this invention is performed. If any emergency disconnect operation is specified by bits 18 and 19, an operation, an understanding of which is not required for an understanding of the present invention is performed. With reference to FIG. 5, if a "start" retrieve data control word operation code is specified by bits 18 and 19, a QCON signal is provided on line 196 to DCW register decoder 46 to enable OR-gate 104 and gates 106 for providing transfer of 18 binary signals on 18 lines, designated in FIG. 5 as DCW relative address lines, into R register 96. The DCW relative address in R register 196 is thus available to address main memory during a DCW retrieval operation. The QCON signal is also applied on line 196 to main control matrix 112 of main memory control 44 to initiate a DCW retrieval operation.

In the waveforms illustrated in FIG. 8, the information, address and control signals that the memory controller receives from extended memory controller 16 during main memory access cycles are identified. The information and control signals that the memory controller transmits to the extended memory controller 16 during main memory access cycles are also identified. In the system of the instant invention, the extended memory controller is capable of issuing main memory cycle commands to the memory controller. Two of the main memory cycle commands are to be described in detail hereinafter. The commands are represented by five signals representing a five bit binary code. Signals representing the five bit binary code are transmitted by means of command lines 80 to memory controller 18. These commands are designated as RRS,DP and CWR,DP in FIG. 8 and hereinafter in the structural and operation descriptions of main memory control 44. FIGS. 4, 5, 7 and 8 will be referred to in the following descriptions of communications between a memory controller and an extended memory controller for controlling the access to memory 10.

Following receipt of a PCW initiating a "start," retrieve data control word operation, the extended memory controller is always in one of two phases, each requiring control of main memory; the retrieve data control word cycle or the control word cycle. In the retrieve data control word cycle, extended memory controller 16 retrieves a DCW from a pair of storage locations in memory 10 and transfers the function portion to F register 152 of DCW register decoder 146 to determine the type of cycle to be entered. In the control cycle, controller 16 controls the type of storage operation to be performed by memory 10 and extended memory 12 under control of the function signals provided by F register decoder 154. The particular mode of operation and type of storage operation to be provided by memory 10 and extended memory 12 is determined by the signals which are present at the output of decoder 154; namely, CNO, DIS, RDY, and WRY and the F1 signal at the output of register 152.

When a DCW is retrieved from main memory, gates 138, 150, 140 and 106, FIG. 5, are selectively enabled as described hereinafter to transfer portions of the DCW1 and DCW2 into the S, F, A and R registers. Addresses for the main memory are provided by the A and R registers 92 and 144 respectively, and adder 100. Base address switches 94 provide 18 binary input signals representing a base address, which are applied to adder 100 and gates 95 by means of cable 98.

The R register 96 is an 18 bit register used to store the relative address of the next DCW to be retrieved from main memory by the controller. The 12 most significant bits designated $R_0$–$R_{11}$ in the R register are added to the 12 least significant bits of the 18 base address signals on cable 98 to form the 18 most significant bits of the absolute address of the next DCW. The six signals representing the six least significant bits of the R register are applied unmodified to gates 116 to form the remaining six bits of the 24 bit absolute address. Since each DCW provides a link address specifying the next DCW cell in a string of cells, the extended memory controller can continue retrieving data control words and transferring data between memories without program attention. When the controller is in the not-busy state and a QCN1 signal is received, the relative address is provided in the PCW accompanying the QCN1 signal as previously described. Adder 100 is a conventional parallel binary adder which forms the sum of an 18 bit operand and a 12 bit operand provided by the control panel base address switches 94 and R register, respectively.

The A register 144 is comprised of 22 flips-flops for storing binary bits representative of the main memory address to be involved in an information transfer. The extended memory controller provides 24 lines of cable 76 designated as $A_0$–$A_{23}$ representing a main memory data address, to the memory controller. The A register flip-flops are coupled only to lines designated as $A_0$–$A_{21}$ of cable 76. During an information transfer, the twenty-fourth line ($A_{23}$) corresponding to the least significant bit of the data address always has a binary 0 signal applied, since the main memory cycle will always be double precision requiring an even numbered address. The twenty-third line ($A_{22}$) corresponding to the seventeenth bit of the data address has a binary 0 signal applied during transfer of the first word pair of a four word transfer and a binary 1 signal applied during the transfer of the second word pair in a second double precision cycle. At the end of a four word transfer, the A register is incremented by one, by a QACT signal received from main memory control 44. The QACT pulse is applied to each flip-flop of the A register, which performs as a counter, to increase the A register count by 1 in a manner well-known in the art. Since the twenty-second line ($A_{21}$) corresponding to the twenty-second bit of the data address receives the output signal from the A register flip-flop representing the twenty-second address bit, the address portion supplied by the A register is actually increased by a count of 4.

S register 142 is comprised of 18 flip-flops for storing bits representative of the extended memory address of information to be involved in an information transfer operation. The most significant 10 bit track portion designated as bits 0–9, FIG. 5, select the required track set. The least significant 8 bit sector portion designated as bits 10–17 is used to select the required sector or guard band. The track portion is applied on lines 51 to track address selection matrix 50 of access control 22 immediately following transfer of DCW1. The least significant 8 bits of the S register are, for example, in the illustrated embodiment applied to synchronization control 48 for serial comparison with the extended memory sector address supplied by waveform DRA of FIGS. 9 and 10. Comparison of the sector address provided by the DRA waveform from extended memory 12 is provided during the Q01 state of the Q counter which provides for the address compare time.

DCW register decoder 46 includes the F register 152 which is comprised of five flip-flops, whose states are decoded by F decoder 154 to provide signals CNO, DIS, RDY and WRY function signals to control the type of storage operation of both main and extended memory. The F register also provides an F1 signal to mode control 43 to provide for control of operation during Mode 1 operation. The F register also receives a signal designated as a G46 signal, to be described hereinafter from PCW decoder 42 to provide for presetting all of the F register flip-flops to the binary "0" state to obtain an all zero binary configuration when a PCW specifies a disconnect operation. Decoder 46 also includes Write FF 196 which provides signals for controlling access control 22 during write operations to be described hereinafter. Decoder 46 further includes AND-gate 170 to provide shift signals to shift registers 64 during read and write operations as will be described hereinafter.

Mode control 43, FIG. 6, receives the CNO, RDY, F1 and WRY signals from DCW register decoder 46 and other signals to be described hereinafter to provide for control of a Normal Mode of a Mode 1 operation. Mode control 43 receives the QDAY and J03 signals from main memory control 44 to control the entry of the mode control CNO and F1 signals from DCW register decoder 46 into TMI FF 204. When DCW register decoder 46 receives the function portion of a DCW representing a mode of operation, mode control 43 receives the CNO and F1 signals from decoder 46. The F1 signal is stored in a flip-flop designated as TMI FF 204 which is set in the binary "1" state following receiving a DCW specifying a Mode 1 operation due to storing a binary 1 F1 signal present in the function portion of the DCW. TMI FF 204, when in the binary "1" state, provides a binary "1" output signal which is applied to decoder 206 in conjunction with the RDY and WRY signals to generate RW2 and WR2 signals for controlling Mode 1 read and write operations respectively. Mode control 43 also includes a flip-flop designated as FAD FF 208 which provides for utilizing the end sector signals from access control 22 to generate start guard band signals for controlling the start of a Mode 1 read or write operation.

Figure 9:
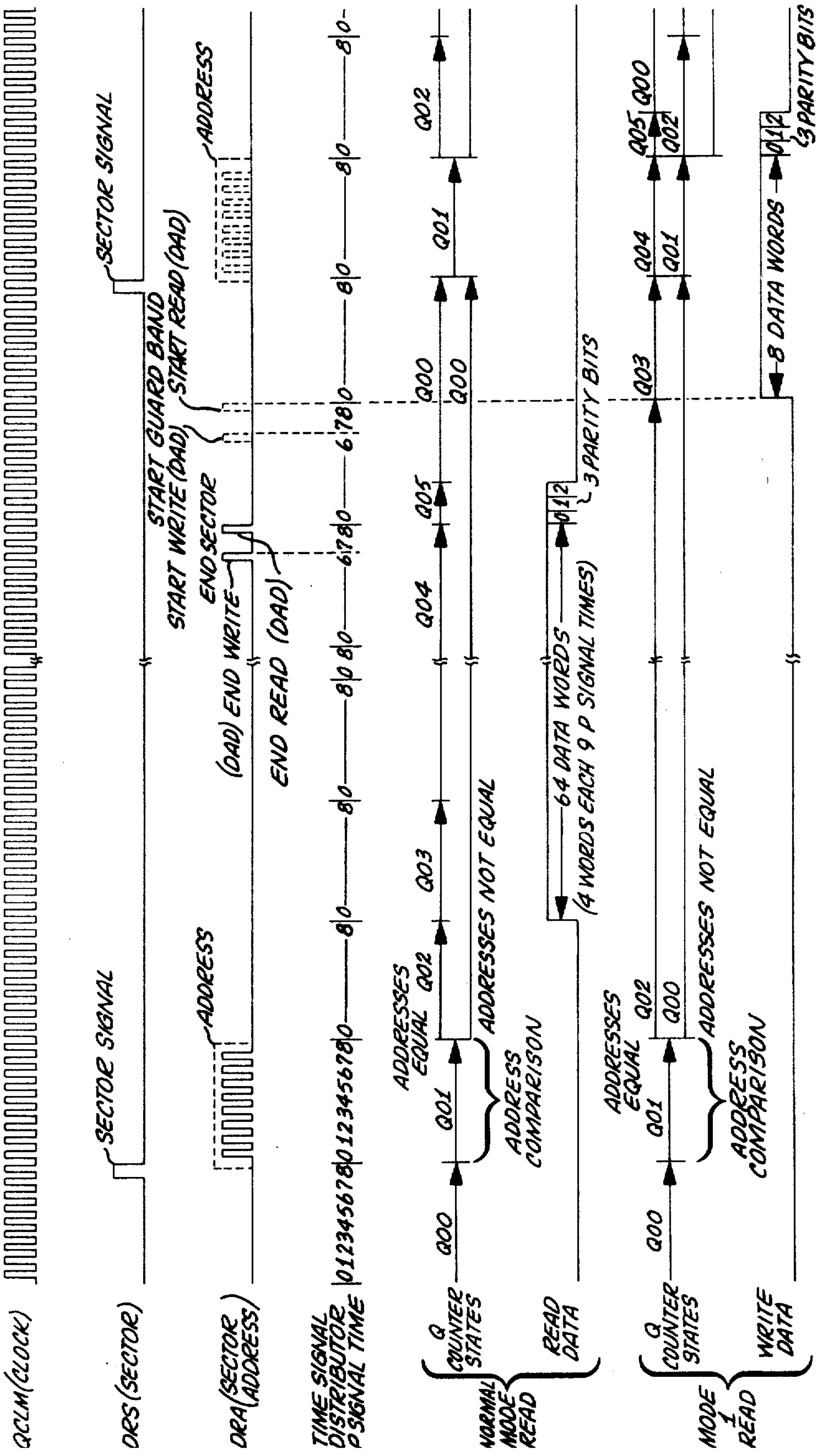
FIG. 9 illustrates waveforms and timing diagrams of the various signals supplied by the extended memory and the extended memory controller of FIG. 4 during read operations.
Figure 10:
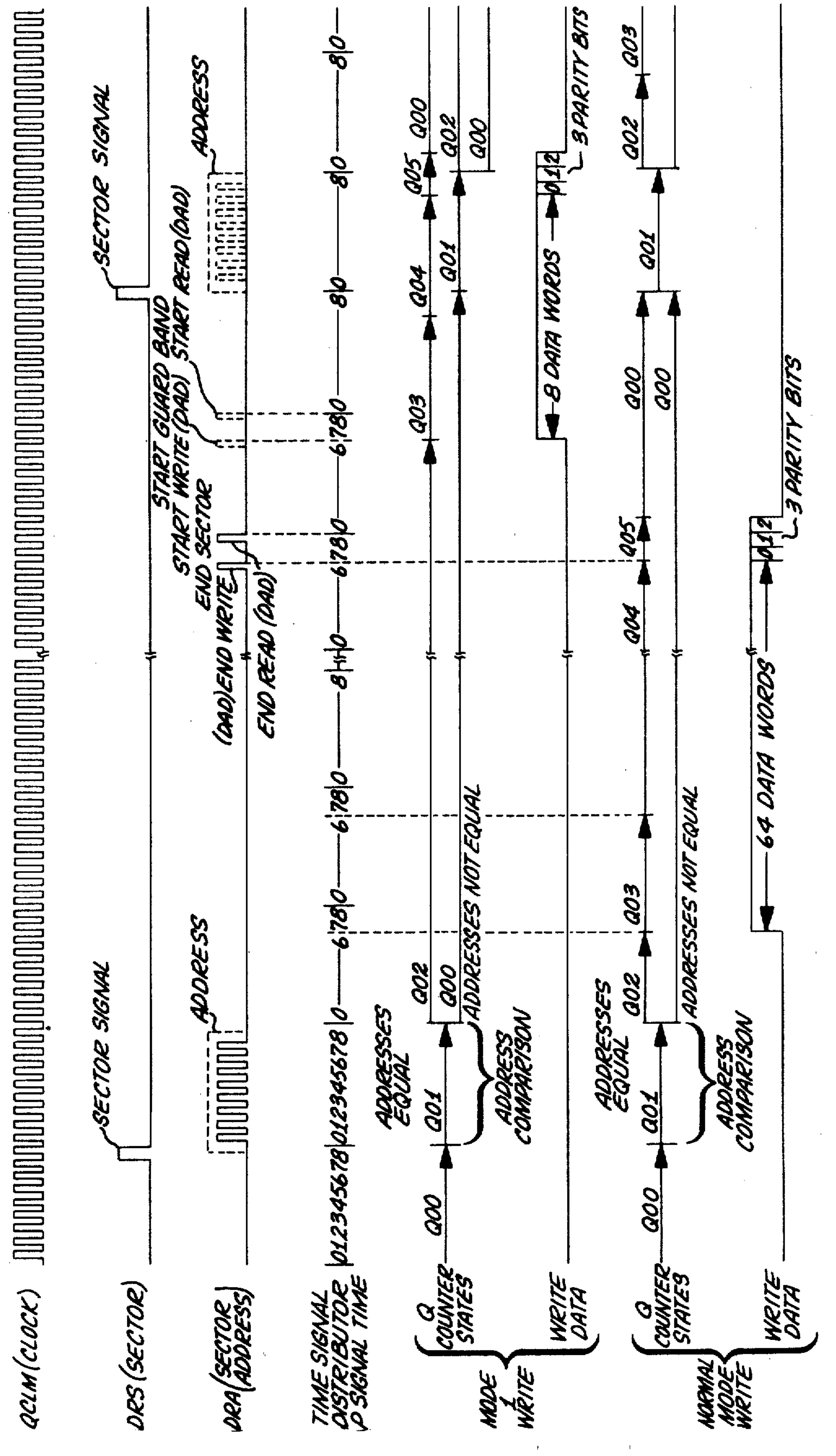
FIG. 10 illustrates waveforms and timing diagrams of the various signals supplied by the extended memory and the extended memory controller of FIG. 4 during write operations.

During a Normal Mode of operation, the DAD output signal from mode control 43 provides the end-sector signals illustrated in the DRA waveforms of FIGS. 9 and 10. During a Mode 1 operation, the DAD output signal provides the start guard band represented in the DRA waveforms of FIGS. 9 and 10. The DAD output signal is applied to synchronization control 48, DCW register decoder 46, data transfer control matrix 156 and main memory control to control operations to be described hereinafter.

Output signals RW2 and WR2 are provided to control operations during reading and writing in Mode 1. The RW2 and WR2 signals are applied to synchronization control 48, DCW register decoder 46, data transfer control matrix 156 and main memory control 44 to control operations to be described hereinafter.

Main memory control 44, FIG. 7, comprises a four stage J counter 114 comprising four flip-flops to provide control signals during all transactions with memory 10. The J counter in its defined states of J02, J01 or J00 is used to provide control signals for transfer of a first and second word during four 36 bit word transfers to and from memory 10, while in its defined states J03 and J05 signals are provided for performing a housekeeping operation and retrieval of a DCW from memory 10 respectively. K counter 115 is a two-stage counter comprising two flip-flops to provide control signals for transfer of a third and fourth word during a four word double precision data transfer to memory 10. The K counter in its defined states of K00, K01 and K02 provides control signals for transferring the third and fourth 36 bit words during a four word transfer to and from memory 10.

Address count control matrix 158, FFY 160, and FFZ 162 provide for incrementing the address applied to memory controller 18 by a count of 4 following each transfer of 4 words between memory 10 and extended memory controller 16. Control for transferring a DCW from memory 10 is provided by LAS FF 132 in conjunction with J counter state J05 to generate QNST and QNFL signals for applying to DCW register decoder 46 for entry of DCW1 and DCW2 into selected registers of decoder 46.

Encoder 122 responds to the J03, J05, J21, RDY and WRY signals to apply a five bit binary coded command, by means of lines of cable 80 to memory controller 18. Outputs from encoder 122 designated as CP, CA, CB, CC and CD, FIG. 7, are applied to lines of cable 80 for transmittal to controller 18. The commands generated in extended memory controller 16 which are described in the following description of the read-restore double precision hereinafter designated as RRS, DP and clear-write, double precision hereinafter designated as CWR,DP. With five command code lines available, it is possible to generate as many as 32 different 5 bit combinations to represent commands. The binary coded output signals for RRS,DP; CWR,DP are as follows:

| | Output lines | | | | |
|---|---|---|---|---|---|
| | CP | CA | CB | CC | CD |
| Command: | | | | | |
| RRS, DP | 1 | 0 | 0 | 0 | 1 |
| CWR, DP | 1 | 0 | 1 | 0 | 1 |

The extended memory controller and memory controller exchange control and information signals as illustrated by the main memory timing signal waveforms of FIG. 8 for the RRS, DP and CWR, DP commands.

Double precision control matrix 180 and interrupt control matrix 110, FIG. 7, provide output signals QDPY on line 78 and QINT on line 82 respectively in a timed relationship to the QDA and QPIN signals received on lines 90 and 94 respectively from memory controller 18. The QDA signal indicates that data signals from main memory can be entered into the extended memory controller or that data signals from the extended memory controller have been received. The QPIN signal indicates that the address and command signals have been accepted by the memory controller. The extended memory controller interrupts memory controller 18 and requests an operation by means of transmitting the QINT signal, generated by enabling interrupt control matrix 110, which serves as an access request signal. The QDPY signal is used during a CWR, DP function to indicate to memory controller 18 that the second 36 bit data word is now present on data lines 86. Further explanation of the timing signals will be given in the detailed operation description hereinafter utilizing RRS, DP and CWR, DP commands.

Extended memory controller 16 transmits one 36 bit word at a time to memory controller 18 over 36 data lines designated as U bus 86, 24 address bits over 24 address lines 76, a double precision rewrite signal over one line 78 designated as QDPY, and five command code signals over lines within cable 80 to provide control communication enabling the controller to control a retrieval or storage operation by memory 10. The 36 data lines of U bus 86 present a 36 bit data word to the memory controller for storage of the information in memory 10. The address lines 76 provide a 24 bit address which selects a 72 bit word contained in two locations with consecutive addresses in memory 10. The least significant address bit is utilized to retrieve or store either the upper or lower half of the 72 bit word that is stored or retrieved in memory 10.

Control panel base address switches 94 shown in FIG. 4 are conventional manual switches which may be set to apply 18 binary signals to base address lines 98. The signals present on lines 98 are utilized by extended memory controller 16 to form absolute addresses as will be described hereinafter during a description of the retrieve data control word cycle of operation.

The memory controller is associated with memory 10. As previously described, the memory controller in the illustrated embodiment utilizes an 18 bit address therefore rendering it possible for the memory controller to provide addresses for controlling access to 256K locations. Data transfers between communicating devices and the memory controller are word oriented and in the embodiment chosen for illustration, two successive 36 bit words are transferred for double precision transfers. The memory controller and its associated core systems operate on a 72 bit basis and a 72 bit word is accessed in memory 10 for each memory address. The 72 bits correspond to two instructions, two operand words, or two control words. The memory controller receives commands from the communicating devices and once a communicating device has been awarded access, the command sent by it to the memory controller is decoded and performed.

Extended memory 12 may be of a type well-known in the art. Extended memory 12 is illustrated in FIG. 4 as comprising a storage unit, which is by way of example, in the form of a set of rotatable magnetic discs or a magnetic drum or it may assume any other suitable known configuration or design. In the following description the extended memory storage unit will be referred to hereinafter as a drum storage unit.

Extended memory 12 is operated in a parallel manner such as described in Digital Computer Fundamentals, Thomas C. Bartee, Lincoln Laboratory, MIT, published by McGraw Hill Publishing Co., Inc., 1960, pages 239–243. Memory 12 is operated under control of access control 22 which is illustrated in FIG. 4 as being comprised of read amplifiers 66, write amplifiers 68, track address selection matrix 50 and synchronization signal amplifiers 49. During parallel operation, 16 bits are written simultaneously or read simultaneously. When the extended memory is read from or written into in parallel, a separate read and write amplifier is required for each track that is used simultaneously. Therefore, to read 16 bits each bit time, 16 read amplifiers 66 are provided. To write 16 bits each bit time, 16 write amplifiers 68 are provided. As the drum rotates, a small area continually passes under each of the read/write heads 38. This area is known as a track. Each track length is subdivided into cells, each of which can store one binary bit. A plurality of successive cells are grouped together to provide the addressable areas previously described as sectors, wherein each sector contains a predetermined number of data words. In the illustrated embodiment a plurality of successive cells are grouped together to provide the addressable areas previously described as guard bands, wherein each guard band contains a predetermined number of data words. In the particular example under consideration a sector contains a block of 64 words of 36 bits each and a guard band contains an item comprised of 8 words of 36 bits each.

Information to be transferred between extended memory 12 and memory 10 is stored in a plurality of adjacent tracks 60 and in the plurality of sectors 62 and guard bands 61 in each of the tracks 60 of rotating disc 37. Sixteen such adjacent tracks are grouped together to provide track sets, FIG. 4. Since there are a number of track sets, the correct set of 16 read/write heads 38 associated with each track set as well as the sector of the tracks must be addressed. Each track is therefore assigned an address representing the number of the track set and each sector or guard band assigned an address representing the number of the sector. In order to specify the address of a sector or guard band, the track set addresses and the sector addresses are specified and stored, for example, in an address register. The track set address is included in DCW1, FIG. 3, in bit positions 0–9 and applied to track address selection matrix 50, FIG. 4. Track address selection matrix 50 responds to signals representing the track set address to provide one output signal for simultaneously activating a set of 16 heads. Appropriate sector and guard band selection means is included in synchronization control 48 to select the proper sector and guard band which contains a desired information word. The sector and guard band address is included in DCW1 as illustrated in FIG. 3 in bit positions 10 through 17.

Extended memory controller 16 locates a specified sector and guard band by employing three waveforms representing timing signals as illustrated in FIGS. 9 and 10 to locate the specified sector and guard band. These three waveforms are received from synchronization signal sources 47 of extended memory 12 through synchronization amplifiers 49 of access control 22. The QCLM master clock waveform represents a series of timing signals, each signal occurring at a time corresponding to the accessibility of a respective bit cell, as the drum rotates. A second waveform identified as the DRS (drum sector) waveform represents a series of signals. Each signal identified as a "sector" signal appears at a time corresponding to the accessibility of the beginning of each sector as the drum rotates. The sector signals of waveform DRS are spaced 180 bit cells apart such that the combined basic sector and guard band are 180 bit cells in length. In addition, a third waveform designated as the DRA drum sector address waveform provides signals representing the sector number of the next accessible sector and guard band along the track. Immediately following each of the previously described sector signals, the extended memory controller receives the sector numbers of addresses from the DRA waveform. The extended memory controller serially receives the waveforms representing the sector number and when this number is equal to the representation of the sector number stored in the S register, the extended memory controller can start control of reading or writing information in the addressed sector.

The DRA waveform, FIGS. 9 and 10, also includes a pair of signals designated as the end sector-end write (DAD) and end sector-end read (DAD). During Normal Mode operations the end sector-end read signal controls termination of read operations. The DRA waveforms, FIGS 9 and 10, also illustrate a pair of signals represented by dashed lines and designated as the start guard band-start write (DAD) and start guard band-start read (DAD) signals. The start guard band-start read signal controls initiating the start of a read operation during a Mode 1 operation. In the case of a Normal Mode operation, the end sector signals control terminating data transmission if a transmission has not already been terminated by reason of some other condition. During a Normal Mode of operation, the end sector-end write (DAD) signal represents the completion time for writing data into extended memory 12 while the end sector-end read (DAD) represents the completion time for reading data from extended memory 12. The storage space utilized in each sector is thus defined by the sector and end sector signals. During a Mode 1 operation when an end sector signal is sensed, control is provided for generating a pair of start guard band signals to control the start of write and read operations during a Mode 1 operation. The start of storage space utilized in each guard band is thus defined by the start guard band signals. When a start guard band signal is sensed, control is provided for beginning the transmission of data between extended memory controller 16 and extended memory 12.

Communications between the extended memory controller and access control 22 are provided by means of a cable designated as line 20 in FIG. 1 which will hereinafter be referred to as cable 20. Cable 20 comprises the plurality of lines and cables illustrated in FIGS. 4 and 5 which include lines to access control 22 designated as track set ADDR. (10 lines), cable 51 contained within cable 20, write enable line 195 and 16 data lines 69. Cable 20 also includes the lines from extended memory 12 providing the three waveforms previously described and received on three lines of a cable designated as QCLM, DRA and DRS, and 16 data lines 67 connected to shift registers 64.

Control of a circulating type memory is well-known in the art. Synchronization control 48 receives the waveforms as previously described, from access control 22. In the illustrated embodiment the S register of DCW register decoder 46, FIG. 5, stores the sector address of the desired sector. Synchronization control 48 compares the sector address portion of the S register with each of the series of addresses received on the DRA line from control 22 until coincidence is achieved. For example, in the illustrated embodiment a series of 8 binary signals designated as "address" on the DRA waveform in FIGS. 9 and 10 and providing a representation of a sector number, is supplied at the beginning of each sector by extended memory 12. The representation of the sector number is then compared with the sector address in the S register until coincidence is obtained. Within synchronization control 48 is a counter comprised of four flip-flops (not shown) which is designated as the Q counter which provides timing signals Q00–Q05 in the sequence shown by the timing diagrams of FIGS. 9 and 10. The Q counter is a conventional counter, which is incremented one count for each change of operation to provide the states indicated in the following table.

| Q Counter State: | Control Operation |
|---|---|
| Q00 | Rest State. |
| Q01 | Compare Sector Address. |
| Q02, Q03 | Read-Rest Time. Write-Retrieve 4 words from main memory. Read or Write Data. |
| Q04 | Read or Write Data. |
| Q05 | Parity Checking. |

The Q counter provides control signals during all transactions with extended memory 12. A signal designated as Q34 is also provided to indicate that the Q counter is in a state of Q03 and Q04.

Synchronization control 48 also includes a conventional timing signal distributor, such as for example, a ring shift register or counter (not shown) which is suitable for providing nine bit timing signals $P_0$–$P_8$ corresponding to each binary 1 portion of the clock signal provided by the QCLM waveform. P timing signals are illustrated in FIGS. 9 and 10 and are supplied throughout extended memory controller 16 to time the various operations as will be described hereinafter. P timing signals provide synchronism with the address waveform from access control 22 and insure sampling of information bits at the proper time. The time interval for the occurrence of the $P_0$–$P_8$ signals represent the extended memory nine bit interval termed a "character time"; therefore, all shifting of the 16 nine bit character registers of shaft register 64 is controlled by shift signals generated under control of P timing signals. The parallel transfer of information between the shift registers and holding registers is also controlled by the P timing signals.

Transfer of information within extended memory controller 16 is provided by data transfer control matrix 156 and transfer gates 172, which provide for parallel transfer of information between the shaft registers and holding registers. Data transfer control matrix 156 also provides control signals for controlling the transfer of information between the holding registers and the N and U buses. Data transfer control matrix 156 receives RDY, WRY, K01, K02, J01, J02, RW2, J05, J00, $P_6$, Q02, Q34 and end of sector signals from DCW register decoder 46, main memory control 44, synchronization control 48 mode control 43 and access control 22. Data transfer control matrix 156 responds to these signals to provide timing signals during information transfer operations as described in the operation description hereinafter.

Holding registers 174 have a capacity of four 36 bit words or a combined length of 144 flip-flops. They are used as a buffer storage for the four words transferred in a main memory information transaction. Since each register contains 36 bits, data transfer control matrix 156 supplies separate control signals for each register during a transfer between main memory and the holding registers. As shown in FIG. 4, four signals designated as QNC0, QNC5, QPD0 and QPD5 are applied to four lines within cable 186, and four signals designated as QCOU, QCBU, QDOV and QDBV are applied to four lines within cable 179. The QNC0, QNC5, QPD0 and QPD5 signals are applied successively to separate sets of 36 gates within data input gates 40 to transfer one 36 bit word at a time into a respective one of first, second, third and fourth 36 bit registers of holding registers 174. In a similar manner, the QCOU, QCBU, QDOV, QDBV signals are applied successively to separate sets of 36 gates, each within data output gates 41 to transfer one 36 bit word at a time from a respective one of first, second, third and fourth 36 bit registers of holding registers 174 to U bus 86. The QECT signal controls certain ones of transfer gates 172 for transferring signals representing the contents of the 16 shift registers to the four holding registers.

The combined 16 shift registers are comprised of 144 flip-flops and are used as extended memory information buffer registers. Each of the 16 shift registers are nine bits in length. During a write operation by extended memory 12, information bits are shifted out of the least significant bit position for each nine bit shift register to the extended memory on data lines 69 by shifting each shift register in response to clock shift signals provided from gate 170 of the DCW register decoder 46, FIG. 5. During a read operation, the information bits are entered into the most significant bit positions of the shift register from extended memory on data lines 67 by these same shift signals. The shift signals occur at the frequency of the master clock QCLM signals. Transfer of data to the holding registers is controlled by transfer gates 172 which are comprised of two separate sets of 144 gates to provide for parallel transfer of the shift register contents to the holding registers in response to the signals applied by data transfer control matrix 156.

Control of access control 22, which in turn controls extended memory 12 to perform a read or write operation, is provided by write flip-flop 190 hereinafter referred to as write FF 190, FIG. 5. During a Normal Mode of operation when a binary "1" WRY signal is applied to one input lead of AND-gate 188 conjunctively with the presence of binary "1" $P_6$, Q02 and RW2 signals on other input leads, gate 188 provides a binary "1" signal on an output lead. The RW2 signal from mode control 43 is applied to inverter 189 to provide an $\overline{RW2}$ binary "1" signal when a binary "0" RW2 signal is present indicating a Normal Mode of operation. The binary "1" signal is applied to one input lead of OR-gate 193 to the S input lead of write flip-flop 190, thereby setting flip-flop 190 to its binary "1" state for providing a binary "1" output signal designated as "write enable" on line 195. During a Mode 1 operation a binary "1" RW2 signal in conjunction with the presence of WRY, $P_6$, Q02 and DAD binary "1" signals on input leads of AND-gate 187 provide for a binary "1" output signal. The binary "1" output signal is applied to one input lead of OR-gate 193 to set flip-flop 190 as previously described to provide a binary "1" "write enable" output signal. The binary "1" "write enable" signal is applied to gated write amplifiers 68, FIG. 4. Therefore, write FF 190 provides operation control of extended memory 12 by enabling write amplifiers 68 to provide signals to be written by a selected set of 16 read/write heads on discs 37. At the completion of a "write" operation specified by a DCW pair, wherein the WRY binary 1 signal during both Normal Mode and Mode 1 operation, is present on one input lead of AND-gate 194 conjunctively with binary "1" and Q05 signals on other input leads, gate 194 provides a binary "1" signal on its output lead. The binary 1 output signal is applied to the R input lead of write FF 190, thereby switching the flip-flop to its reset state providing a binary 0 output signal on line 195 to write amplifiers 68. Write amplifiers 68 are disabled by the binary 0 signal to prevent further writing of information on discs 37. During a read operation the write FF remains in a binary 0 state and write amplifiers 68 are inactive. Thus, the F register output provides for controlling the mode and type of operation to be performed by extended memory 12.

DCW register decoder 46 provides control for applying shift signals to sixteen 9 bit character shift registers during read or write operations. AND-gate 170 receives on one input lead, the QCLM waveform, and provides output shift signals corresponding to each clock binary 1 signal to each of the 16 shift registers on line 171. AND-gate 170 provides a binary "1" output signal, during a read operation, for each binary 1 input signal provided by the QCLM waveform during the time when the Q counter is in states Q03 or Q04. During a write operation, AND-gate 192 and inverter 169 serve to inhibit gate 170 during $P_6$ time to prevent providing a shift signal at $P_6$ time when new information is being transferred in parallel from the holding registers to the shift registers. AND-gate 192 provides a binary "1" output signal during $P_6$ time to inverter 169 which in turn provides a binary "0" output signal. The binary "0" signal is applied to one input lead of gate 170 for inhibiting gate 170 from providing a binary "1" output signal during every $P_6$ time of a write operation.

Further details of the logic of extended memory controller 18 will be described in the following operational descriptions covering the retrieve data control word cycle of operation and control of the execution of DCW's specifying read and write operations.

Operating system program initiation of extended memory controller 16 to perform an operation is provided by a computer of a data processing system, such as in the system illustrated in FIG. 1, executing a connect instruction. Execution of the connect instruction results in memory controller 18 retrieving a PCW from memory 10. A memory controller, such as memory controller 18, responds to the instruction to retrieve a PCW from memory 10, generates and supplies a QCN1 signal on line 88, FIG. 4, and supplies the signals of a PCW on lines 0–35 of N bus 74. The N bus lines providing signals corresponding to bits 18 and 19 of the PCW are connected to PCW decoder 42 and the QCN1 signal is also applied to PCW decoder 42. PCW decoder 42 responds to the QCN1 signal and a binary 1 signal on N line 18 corresponding to bit 18 of the PCW received to generate a binary "1" QCON signal.

The extended memory controller is in a rest state, indicated by the F register containing all zeros and the J and Q counters being in their J00 and Q00 states, at the time of receiving the PCW specifying a "start," retrieve data control word operation. PCW decoder 42 decodes bits 18 and 19 when the QCN1 signal is binary 1 and when bit 18 is a binary "1" to generate the QCON signal. The QCON signal is transmitted on line 196 of cable 108 to DCW register decoder 46, FIGS. 4 and 5, to one input lead of gate 104 which provides a binary "1" output signal to input leads of gates 106, the R register transfer gates, to transfer signals on N bus lines 0–17 corresponding to bits 0–17 of the PCW into R register 96. As described previously, bits 0–17 of the PCW provide the relative address of the location of main memory containing a DCW.

Figure 6:
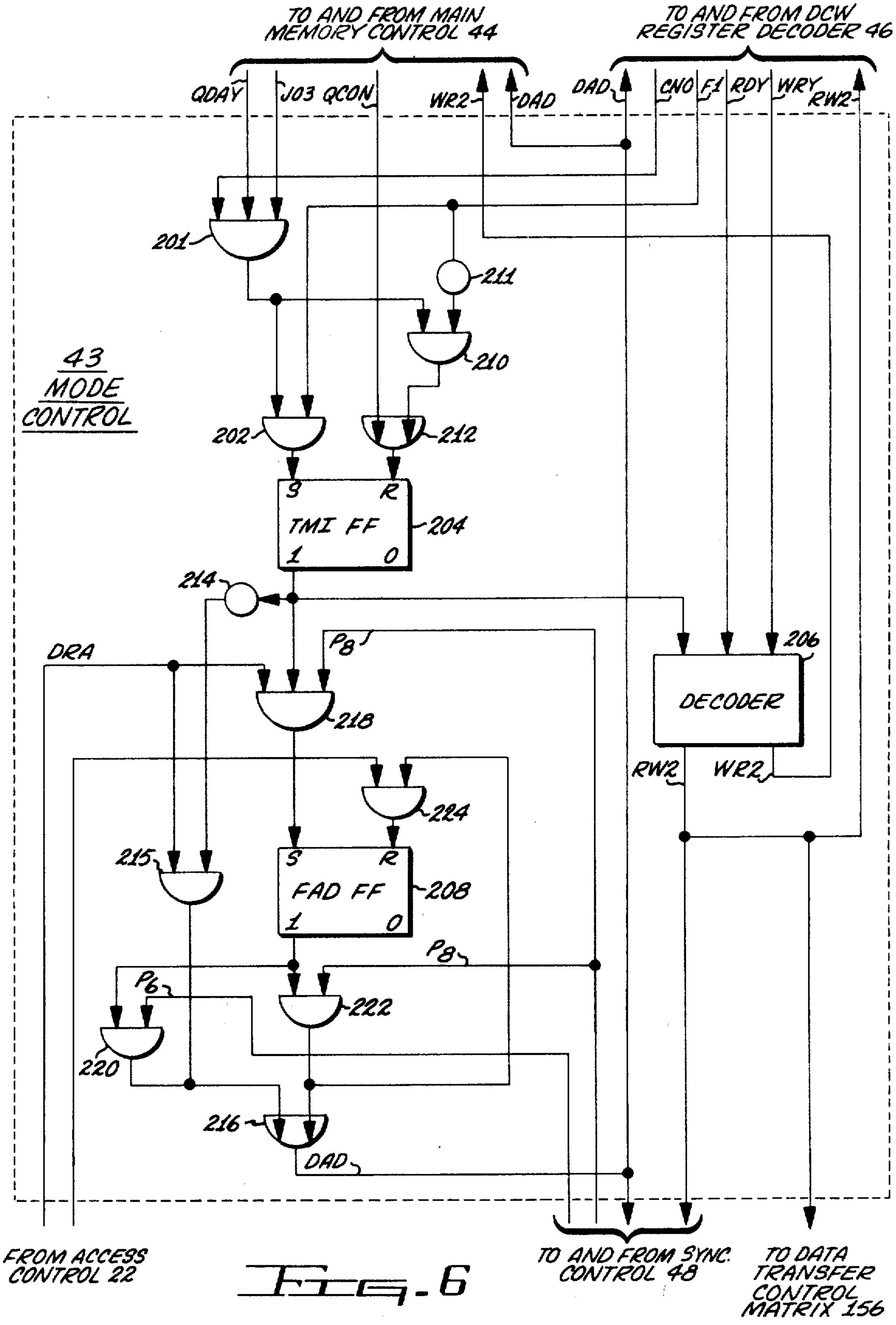
FIG. 6 is a block diagram of the mode control of FIG. 4.

The QCON signal is applied to mode control 43, FIG. 6, to control establishing a Normal Mode of operation following receiving a PCW specifying a "start," retrieve data control word operation. The QCON signal is applied to one input lead of OR-gate 212 which responds to provide a binary "1" output signal on the R input lead of TM1 FF 204 for resetting FF 204 to a binary "0" state thereby establishing a Normal Mode of operation.

The QCON signal is also applied by means of line 196, FIG. 7, to interrupt control matrix 110 of main memory control 44 to generate a QINT signal which is applied on line 82 through control bus 85 to memory controller 18.

The QCON signal is further applied to main control matrix 112. In response to the QCON signal, matrix 112 provides signals for presetting J counter 114 to a state of J05, which is the J counter state providing control signals for a retrieve data control word cycle.

The J05 signal applied to encoder 122 provides for a command code consisting of a 10001 binary signal combination at the output of encoder 122 on lines designated CP, CA, CB, CC and CD respectively. This binary configuration corresponds to a RRS, DP command which is applied by means of thefi ve command code lines 80 through control bus 85 to memory controller 18. Since the DCW relative address from the PCW has previously been entered into R register 96 and the 12 most significant bits applied to adder 100 along with the 18 bit base address on lines of cable 98 from control panel base address switches 94, the sum at the output of adder 100 represents the 18 most significant bits of an absolute main memory address of the location containing the first of a pair of DCW's. The 18 line output of adder 100 and six least significant bits of the R register are then present at gates 116 in conjunction with the J05 signal on line 120 to enable gates 116 to transfer the 24 bit DCW absolute address signals to address lines 76 and applied through control bus 85 to memory controller 18.

The J05 signal is also applied to synchronization control 48 for presetting the Q counter to a state of Q00 in anticipation of a DCW specified transfer operation. The LAS flip-flop 132 of FIG. 7 is always in the binary 0 state, following a previous retrieval of a DCW, as will be described hereinafter. A binary 0 output signal from LAS flip-flop 132 is therefore applied in conjunction with the J05 signal on lines coupled to gate 134.

Memory controller 18 responds to the QINT signal which serves as a request for access from extended memory to provide a double precision memory cycle utilizing the command code and address provided by controller 16 for retrieving a DCW from the specified memory location. During a double precision cycle for retrieval of two 36 bit words, the memory controller provides a QPIN signal acknowledging receipt of the command and address signals from control bus 85. Following the retrieval of a DCW by the memory controller from a pair of locations in memory 10, the memory controller transmits a QDA signal, FIG. 8, indicating that DCW1 is present on N bus 74 for transfer to the extended memory controller. The QDA signal, in conjunction with the J05 and the LAS flip-flop binary "0" output signal control AND-gate 134 to generate a QNST signal which is applied by means of line 136 to gates 138 and 140 of DCW register decoder 46, FIG. 5.

Since the signals representing DCW1 are now present on N bus 74, the QNST signal on line 136 enables gates 138 and 140 to transfer the signals present on N bus 74 lines corresponding to DCW1, bits 0–17 into S register 142 and DCW1 bits 18–35 into the 18 most significant bit positions of A register 144. The QNST signal is also applied to A register 144 for resetting the flip-flops providing signals representing the 18–21 bits of the data address. The A register now contains the address of a location in memory 10 coupled to memory controller 18. The QNST signal is also applied to the S input of the LAS FF to set the LAS FF to its binary 1 state. Following a predetermined delay time, memory controller 18 applies a second QDA signal on line 90 which indicates that DCW2 is now present on N bus 74. The QDA signal is applied to gate 146 in conjunction with the J05 signal and binary 1 output signal from the 1 output lead of LAS FF to control gate 146 for providing an output binary 1 signal designated QNFL on line 148. The J05 signal and binary 1 output signal from LAS FF are applied to interrupt control matrix 110, FIG. 7, to provide a QINT pulse to memory controller 18 by means of line 82 thereby requesting a main memory access in advance of the next main memory transaction.

The QNFL signal on line 148 provides for the transfer of portions of DCW2 into extended memory controller 16 when applied to input leads of gates 104 and 150, FIG. 5. OR-gate 104 provides a binary "1" output signal when either a QCON binary "1" signal or QNFL binary "1" signal is present to in turn enable gates 106 to transfer the signals of DCW2 which are applied to gates 106 from N bus 74 such that DCW2 bits 0–17 are transferred into the R register. The QNFL signal on line 148 also enables gates 150 to transfer DCW2 bits 18 through 22 into F register 152, and resets the LAS flip-flop to its binary 0 state. Before the LAS flip-flop is reset, its binary 1 output signal is applied to main control matrix 112 in conjunction with QDA and J05 signals to preset J counter 114 to a state of J03. The F register now contains a five bit binary code designating a particular type of operation to be controlled in a Normal Mode of operation by the extended memory controller. F decoder 154 responds to the binary configuration in the F register to provide an output signal designating a disconnect, read or write operation as previously described.

With J counter 114 in the J03 state, a housekeeping operation requiring a main memory access is performed, an understanding of which is not necessary for an understanding of this instant invention. This main memory access requires communication with the memory controller 18 and provides a QDA signal on line 90 in conjunction with a J03 signal from K and J decoder 118, FIG. 7, to advance controller 16 into a control state for controlling the execution of the operation represented by the decoded output of the F register in a Normal Mode.

The QCON signal generated in response to receiving the PCW specifying a "start," retrieve data control word has placed TM1 FF 204 of mode control 43 in a binary 0 state as previously described. With a binary "0" output signal from TM1 FF 204 applied to inverter 214, a binary "1" signal from inverter 214 is applied on one input lead to gate 215 in conjunction with the DRA waveform from access control 22. Gate 215 responds to provide binary "1" output signals corresponding to the end sector signals illustrated in FIGS. 9 and 10. The binary "1" end sector signals are applied to OR-gate 216 to generate binary 1 output signals on the DAD output line. The binary "1" output signals designated as end sector-write (DAD) and end sector-read (DAD) in FIGS. 9 and 10 are thereby provided for controlling the end of Normal Mode write and read operations.

The Normal Mode read and write operations provided for reading or writing 64 data words in a sector of extended memory 12. The sequence of operation for performing a read and write operation when the F register contents are 11000 (RDY) and 11010 (WRY) is performed under control of extended memory controller 18 in the manner disclosed in copending memory application by John F. Couleur et al., entitled "Data Storage Control Apparatus for a Multiprogrammed Data Processing System," assigned to the same assignee as this patent application and bearing Ser. No. 708,633 and filed on Feb. 27, 1968. The Normal Mode read and write sequences of operation are as represented in the timing diagrams of FIGS. 9 and 10 respectively.

Briefly, the Normal Mode read operation is provided during the Q counter states of Q00–Q05 such that when the DRS sector signal is received, the Q counter of synchronization control 48 is advanced from a Q00 state to a Q01 state. During the Q01 state, a comparison of the address signals presented in the DRA waveform with the address present in S register 142 is provided. When the addresses are equal, the Q counter is advanced to a state of Q02 and at the next $P_8$ signal time is advanced to a Q03 state. During the Q03 state 16 bits are read in parallel, each bit time, from extended memory 12. With the Q counter in a state of Q03 and a $P_0$ signal time, the QCLM clock waveform signals are utilized to serially shift bits into each of the sixteen 9 bit character registers of shift registers 64. When the next $P_8$ signal is received, sixteen 9 bit characters have been read and entered into shift registers 64 and may be transferred to holding registers 174 for transfer to memory 10. At the $P_8$ signal time the Q counter is incremented to a Q04 state during which time 60 additional data words are read from extended memory 12 and transferred to holding registers 174 for transfer to memory 10. Upon sensing the end sector-end read (DAD) signal, the Q counter is incremented to a Q05 state during which time three parity bits are read from extended memory 12 and checked in a conventional manner. At the end of the parity check at a $P_2$ time the Q counter is preset to a Q00 state and again is preset to a Q01 state when the next sector signal appears on the DRS waveform.

A Normal Mode write operation is performed similarly as illustrated in the Normal Mode Write timing diagrams, FIG. 10. The end sector-end write (DAD) controls the end of the Normal Mode write operation. The end sector-end write (DAD) and end sector-end read (DAD) signals therefore control the end of Normal Mode read and write operations respectively, as illustrated in FIGS. 9 and 10 respectively.

As disclosed in the aforementioned Couleur et al. copending patent application, a next data control word is automatically retrieved from memory 10 by extended memory controller 16 following the control of execution of each DCW. The J counter is also preset to a J03 state following each DCW retrieval operation to provide for the previously described housekeeping operation. When it is required to change the mode of operation from a Normal Mode to Mode 1 for performing the type of storage operations associated with a transfer operation specified by a DCW at guard bands, the next DCW retrieved includes a function portion representing a Mode 1 operation. Following retrieval of a DCW representing a Mode 1 operation, the F register contains a binary configuration of 11001 designating that a Mode 1 operation is to be controlled by the extended memory controller. F decoder 154 responds to the binary configuration in the F register to provide a binary "1" CNO output signal and the F register provides a binary "1" F1 signal. The binary "1" CNO output from decoder 154 and binary "1" F1 signal from F register 152 are applied to mode control 43 in conjunction with the QDAY and J03 signals resulting from a housekeeping operation. The CNO, QDAY and J03 signals are applied conjunctively to separate input leads of gate 201 for providing a binary 1 output signal to an input lead of gate 202. The binary "1" F1 signal from DCW register decoder 46 is applied to gate 202 in conjunction with the binary 1 output signal from gate 201 for providing a binary 1 output signal to the S input of TM1 FF 204. The binary 1 signal applied to the S input of TM1 FF 204 controls setting the TM1 FF 204 flip-flop to its binary "1" state, thereby providing a binary 1 output signal from the 1 output of TM1 FF 204.

The TM1 FF 204 flip-flop in a binary "1" state signifies that a Mode 1 operation has been specified by F register 152 and that mode control 43 is to provide control signals for controlling a Mode 1 operation. The binary 1 output signal from the 1 output of TM1 FF 204 is applied to one input lead of gate 218 and a $P_8$ signal from synchronization control 48 applied to a second input lead. The DRA waveform from access control 22 is applied to a third input lead of gate 218, such that gate 218 provides a binary "1" output signal when an end sector-end read (DAD) signal is present in conjunction with a $P_8$ signal. The binary 1 output signal from TM1 FF 204 is also applied to the S input lead of flip-flop FAD FF 208 for setting FF 208 to a binary 1 state to provide a binary 1 output signal from its 1 output to input leads of gates 220 and 222.

FAD FF 208 provides for generating the signals designated as start guard band-start write (DAD) and start guard band-start read (DAD) signals represented by the dashed line signals of the DRA waveform of FIGS. 9 and 10. The binary 1 output signal from FAD FF 208 applied to gate 220 provides for obtaining a binary "1" output signal from gate 220 when a $P_6$ signal is present. The binary 1 output signal from gate 220 is applied to an input lead of gate 216 to provide a binary "1" start guard band-start write (DAD) signal. The binary 1 output signal from FAD FF 208 is applied to one input lead of gate 222 and a $P_8$ signal is applied to a second input lead of gate 222 to provide a binary 1 output signal. The binary "1" output signal from OR-gate 222 is applied to one input lead of OR-gate 216 to provide a binary "1" output signal designated as start guard band-start read (DAD) identified in FIGS. 9 and 10. The binary 1 output signal from gate 222 is also applied to one input lead of gate 224 and a QCLM signal from access control 22 is applied to a second input lead of gate 224 to provide a binary 1 output signal to the R input lead of FAD FF 208. The binary "1" signal applied to the R input of FF 208 controls placing the FAD FF 208 flip-flop in a binary "0" state following generation of the start guard band signals.

The binary 1 output signal from TM1 FF 204, when placed in the binary "1" state designating a Mode 1 operation, is also applied to decoder 206. Decoder 206 responds to provide further decoding of the RDY and WRY signals from the output of DCW register decoder 46 to generate RW2 and WR2 signals designating a Mode 1 read or write and a Mode 1 write operation respectively. The RW2 signal is applied to synchronization control 48 for controlling the advancing of the Q counter states during Mode 1 read and write operations. The RW2 signal is also applied to data transfer control matrix 156 to control the parallel transfer of data being read or written between holding registers 174 and shift registers 64. The RW2 signal is applied to DCW register decoder 146 to control the write flip-flop for providing the write enable signal to access control 22 during a Mode 1 write operation. The WR2 signal is applied to main memory control 44 to provide control during the retrieval of words from memory 10 for storage in extended memory 12.

The binary "1" CNO signal is also applied to main memory control 44. Since the J counter is in a J03 state as a result of performing a housekeeping operation following the retrieval of the DCW representing a Mode 1 operation, the J03 and CNO signals are conjunctively applied to control 44. The CNO and J03 signals are applied conjunctively to main control matrix 112 of control 44 which responds to preset the J counter to a J05 state to control the retrieval of a next DCW in the manner previously described.

Following retrieval of the next DCW, J counter 114 is placed in a J03 and a housekeeping operation requiring a main memory access is again performed as previously described. The resulting QDA signal on line 78, J03 signal from K and J counter decoder 118, FIG. 7 and decoded output of F register 152 are utilized to advance the extended memory controller into a control stae for controlling the execution of a Mode 1 read or write operation represented by the decoded output of F register 152.

To illustrate the sequence of action by the extended memory controller during execution of a data control word including a function code representing a read operation during Mode 1, Table I is provided. The F register provides the RDY signal to decoder 206 of mode control 43, FIG. 6, in conjunction with the binary 1 output signal from TM1 FF 204, thereby providing a binary 1 RW2 output signal from decoder 206. Both the RDY and RW2 signals are utilized to provide control during the read operation of Mode 1.

TABLE I.—DATA CONTROL WORD—MODE 1 READ OPERATION
[F Register Contents=11000 (RDY)]

| Q Counter State | J and K Counter States | Control Signals | Action |
|---|---|---|---|
| Q00 | J03, K00 | QDA·RDY | Preset J and K counters=J00 and K00 Reset FFY and FFZ flip-flops to binary 0 state. |
| Q00 | J00, K00 | DRS | Enable address comparator Enable time signal distributor to generate $P_0$–$P_8$ signals in response to the QCLM clock signals. Increment Q counter=Q01. |
| Q01 | J00, K00 | DRA·QCLM·$\overline{P_8}$ | Compare sector address of S register with address from access control. |
| Q01 | J00, K00 | $P_8$ | Check for address comparison. If comparison is achieved, increment Q counter=Q02. |

TABLE I—Continued

| | Q Counter State | J and K Counter States | Control Signals | Action |
|---|---|---|---|---|
| | Q02 | J00, K00 | $P_8$·RW2·DAD | Increment Q counter=Q03. |
| | Q03 | J00, K00 | QCLM·RW2 | Shift data from tracks into shift registers. |
| | Q03 | J00, K00 | $P_8$·RDY | Increment Q counter=Q04. Parallel transfer of contents of shift registers to holding registers. Preset J and K counters=J02 and K02. Set FFY and FFZ flip-flops to binary 1 state generate and apply QINT signal to memory controller. Generate and apply CWR,DP (10101) signals to command lines for transmittal to memory controller. Transfer A register output signals to address lines 0-17. |
| | Q04 | J02, K02 | RDY | Transfer 1st holding register output signals to U bus. |
| | Q04 | J02, K02 | QDA·RDY | Decrement J counter=J01 Transmit a QDPY signal to memory controller. |
| | Q04 | J01, K02 | RDY | Transfer 2nd holding register output signals to U bus. Apply a binary "1" to address line 16. |
| | Q04 | J01, K02 | QPIN | Generate and apply QINT signal to memory controller. |
| | Q04 | J01, K02 | QDA | Decrement J counter=J00. Reset FFY flip-flop to binary 0 state. |
| | Q04 | J00, K02 | RDY | Transfer 3rd holding register output signals to U bus. |
| 199 | Q04 | J00, K02 | QDA | Decrement K counter=K01. Transmit a QDPY signal to memory controller. |
| | Q04 | J00, K01 | RDY | Transfer 4th holding register output signals to U bus. |
| | Q04 | J00, K01 | QDAY | Decrement K counter=K00. Reset FFZ flip-flop to a binary 0 state. |
| 199 | Q04 | J00, K00 | $\overline{FFY}\cdot\overline{FFZ}$ | Generate a QACT signal. |
| | Q04 | J00, K00 | QACT | Add 4 to A register. |
| | Q04 | J00, K00 | $P_8$·RW2 | Increment Q counter=Q05. Parallel transfer of signals from shift registers to holding registers. Preset J and K counters=J02 and K02. Set FFY and FFZ flip-flops to binary 1 state. Generate and apply QINT signal to memory controller. Generate and apply CWR, DP (10101) signals to command lines. Transfer A register output signals to address lines 0-17. |
| | Q05 | J02, K02 | RDY | Transfer 1st holding register output signals to U bus. |
| | Q05 | J02, K02 | QDA | Decrement J counter=J01. Transmit a QDPY signal to memory controller. |
| | Q05 | J01, K02 | RDY | Transfer 2nd holding register output signals to U bus. Apply a binary "1" to address line 16. |
| | Q05 | J01, K02 | QPIN | Generate and apply QINT signal to memory controller. |
| | Q05 | J01, K02 | QDA | Decrement J counter=J00. Reset FFY flip-flop to binary 0 state. |
| | Q05 | J00, K02 | $P_2$·RDY | Preset Q counter=Q00. |
| | Q00 | J00, K02 | RDY | Transfer 3rd holding register output signals to U bus. |
| | Q00 | J00, K02 | QDA | Decrement K counter=K01. Transmit a QDPY signal to memory controller. |
| | Q00 | J00, K01 | RDY | Transfer 4th holding register output signals to U bus. |
| | Q00 | J00, K01 | QDA | Decrement K counter=K00. Reset FFZ flip-flop to binary 0 state. |
| | Q00 | J00, K00 | $\overline{FFY}\cdot\overline{FFZ}$ | Generate a QACT signal. |
| | Q00 | J00, K00 | QACT | Preset J counter=J05. Generate and apply QINT signal to memory controller. |
| | Q00 | J05, K00 | ------------------- | Go to retrieve data control word cycle. |

If the F register contains a binary configuration of 11000, F register decoder 154 provides the RDY signal, which is applied to main memory control 44, mode control 43, and synchronization control 48. The RDY signal applied to mode control 43 is utilized in conjunction with the TM1 FF 204 output signal to generate a RW2 output signal from decoder 206 as previously described.

With the J counter, FIG. 7, in a state of J03 prior to the previously described housekeeping operation, the QDA pulse, which is received from memory controller 18 as a result of the housekeeping operation, is conjunctively combined with a J03 signal and a RDY signal by control matrix 112 to provide an output signal for presetting the J and K counters to a state of J00 and K00 respectively. The J03, QDA and RDY signals are also applied to address count control matrix 158, which in turn provides signals for switching flip-flops FFY 160 and FFZ 162 to their binary 0 states. Since the Q counter of synchronization control 48 has previously been set to a state of Q00 during the previously described retrieve data control word cycle, the Q00 signal and next sector signal occurring in the DRS waveform, FIG. 8, conjunctively enable the time signal distributor of synchronization control 48, to start providing $P_0$–$P_8$ timing pulses throughout the extended memory controller in synchronization with binary 1 signals of the QCLM clock waveform. At the same time, the Q counter of synchronization control 48 is advanced to a count of Q01. With the Q counter in a state of Q01, the sector address portion of the S register is compared by the comparator of the synchronization control 48 with the binary configuration comprising the address presented in the DRA waveform.

The comparator of synchronization control 48 serially compares S register bits 11–17 with the sector address presented in the DRA waveform of FIGS. 9 and 10 bit-by-bit during each $P_0$–$P_7$ timing signal and at $P_8$ time provides a test for comparison by one of the techniques well-known in the art. If the addresses are equal, synchronization control 48 increments the Q counter to a state of Q02. If the addresses are not equal, the Q counter is preset to the Q00 state to await the presence of the next sector signal to increment the Q counter to a Q01 state and provide another comparison. Synchronization control 48 responds to the Q counter in a Q02 state, the start guard band-start read (DAD) and RW2 signals from mode control 43, and a $P_8$ signal from the timing signal distributor to increment the Q counter to a Q03 state. Synchronization control 48 responds to the Q counter in a Q03 state to provide a Q34 signal which is applied to AND-gate 170, FIG. 5. The Q34 signal, the QCLM signal from extended memory 12 and a binary one signal from inverter 169 are applied conjunctively to separate input leads of AND-gate 170. AND-gate 170 responds to provide shift signals corresponding to each binary 1 signal of the QCLM signal on line 171 and identified as QESR shift signals, to each of the 16 nine bit character shift registers of shift registers 64. The shift signals are applied to shift registers 64, such that at the $P_0$ signal time the first data bit will be shifted from each of the 16 read amplifiers 66, as received from the 16 tracks selected by track address selection matrix 50, into the first stage of each of the 16 nine bit character registers of shift registers 64. Shift signals will continue to be applied during a read-operation throughout the duration of a Q34 signal with each shift signal occurring in response to a corresponding binary 1 signal of the QCLM waveform of FIG. 9.

At a Q counter state of Q03, and the occurrence of the $P_8$, J00, K00 and RDY signals, the Q counter of synchronization control 48, is incremented to a state of Q04. The next $P_8$ signal provided by control 48 during a Q counter state of Q04 will indicate that nine shift pulses have been applied to each of the 16 nine bit character shift registers and that a nine bit character is present in each of the shift registers.

The $P_8$ signal is also applied to data transfer control matrix 156 in conjunction with the Q34 and RDY signal to provide the QECT output signal, FIG. 4, to transfer gates 172. A set of 144 gates within transfer gates 172 respond to the QECT signal to provide for a parallel transfer of the contents of the 16 nine bit character registers of shift registers 64 to the four 36 bit word registers of holding registers 174. Q34, $P_8$ and RDY signals are applied in a similar manner to main control matrix 112, which responds to provide output signals to both the K and J counters for setting their respective states to K02 and J02. The Q34, $P_8$ and RDY signals are also applied to address count control matrix 158 of FIG. 7 for providing signals for switching flip-flops FFY 160 and FFZ 162 to the binary 1 state. Q34, $P_8$ and RDY signals also enable interrupt control matrix 110 to generate a QINT signal which is transmitted by means of line 82 through control bus 85 to memory controller 18. The K and J decoder 118 outputs J21 and K21 are applied in conjunction with the RDY signal from F decoder 154 to encoder 122 to provide the binary coded command signal 10101 corresponding to a CWR–DP command on lines 80 through control bus 85 to controller 18. The J21 and K21 signals are also applied by means of lines 120 to enable OR-gate 173 thereby providing a binary 1 signal to gates 174 to provide for transferring signals from A register 144 to address lines 76 through control bus 85 to controller 18. Binary 0 signals are always applied from gates 144 to address lines corresponding to bits 22 and 23 of lines 76. The J02, K02, Q04 and RDY signals are now applied to transfer control matrix 156 to generate and provide a QCOU signal on lines 179 to data output gates 41, which include a set of 36 gates responsive to the QCOU signal to transfer signals of a first holding register through U bus 86 for applying to controller 18.

The waveforms of FIG. 8 illustrate that memory controller 18 responds to the QINT pulse on line 82 to provide a cycle started signal $TS internally to the memory controller for initiating a main memory access operation.

Following the cycle started condition within memory controller 18, the command and address lines are sampled and a QPIN signal is transmitted from the memory controller 18 to extended memory controller 16 on line 84 of the control bus to indicate that the command and address lines have been sampled and that the command and address signals may now be removed. Controller 18 next samples the signals present on the 36 lines of U bus 86 and provides for storing the first word of the four 36 bit word registers of holding registers 174 in the memory location specified by the address. Since the memory controller can accept only 36 data lines at a time, controller 16 must transfer the four 36 bit words in holding registers 174 one word at a time and provide control for two successive CWR, DP cycles of memory.

The read operation continues in accordance with the sequence of operation illustrated in Table I.

While four words in holding registers 174 are being stored in memory 10 by memory controller 18, the sixteen 9 bit character shift registers 64, FIG. 4, have been receiving shift signals. The shift signals provided through enabled gate 170, as illustrated in FIG. 5, correspond to each binary one signal supplied by the QCLM signal. As illustrated by line 199 in Table I, the shift signals are provided during the time interval that the Q counter remains in its Q03 or Q04 state for a read operation. Therefore, following every nine successive shift signals, the next sixteen 9 bit characters to be transferred to holding registers 174 are present in shift registers 64. At each $P_8$ time during Q03 or Q04 state of the Q counter, data transfer control matrix 156 is controlled to provide a signal for enabling transfer gates 172 to provide a parallel transfer of signals representing the contents of the sixteen 9 bit character registers of shift registers 64 to the four 36 bit registers of holding registers 174. The $P_8$ signal, occurring during the Q04 state of the Q counter, sets the J and K counters to the J02 and K02 states respectively to provide J21 and K21 signals for the transfer of four words to main memory. The J21 and K21 signals, in conjunction with the RDY signal, initiate a CWR, DP memory cycle for storing the first two words in holding registers 174 which is followed by a second CWR, DP memory cycle for storing the next two 36 bit words contained in holding registers 174.

Following each $P_8$ timing signal or every nine shift signals during Q counter states of Q03 and Q04, four 36 bit words are transferred in parallel from the shift registers to the holding registers and stored within memory 10. After the transfer of the first 2 words FFY 160 is reset and after the second two words FFZ 162 is reset. When FFY 160 and FFZ 162 are both reset and gate 184 provides a QACT signal for incrementing the A register count by 1 to provide a corresponding increase of 4 in the numerical value of the address signals applied to address lines $A_0$–$A_{23}$. The incremented addresses are representative of memory locations with consecutive addresses for storage of an item of data words, such as for example, an item of 8 data words in memory 10. As previously described, 8 data words are contained within each guard band of information transferred from extended memory to main memory.

With the Q counter in a state of Q04 and a $P_8$ signal present, the Q counter of synchronization control 48 in FIG. 4 is incremented to a state of Q04. At the Q04 and $P_8$ time, the last 16 nine bit characters of an addressed sector have been shifted into shift registers 64. An additional parallel transfer from the shift registers to the holding registers is therefore required and two additional CWR, DP memory cycles must be provided by memory controller 30. The Q05 signal, in conjunction with a $P_2$ timing signal, provides for presetting the Q counter to a state of Q00 thereby providing a Q00 signal.

After the transfer and storage of four additional 36 bit words, a QACT signal is generated as a result of resetting flip-flops FF 160 following transfer of the first two words and FFZ 162 following the transfer of the second two words. The QACT signal is utilized in conjunction with the Q00 state of the Q counter to enable main control matrix 112 to preset the J counter to a state of J05. K and J decoder 118 then provides a J05 binary "1" output signal. The J05 signal is then applied to interrupt control matrix 110 to enable the interrupt control matrix to provide a QINT signal on line 182 to memory controller 18. With the J counter in a J05 state, the extended memory controller is in an operating condition for controlling the retrieval of a DCW from main memory.

As illustrated by the waveform designated as read data for Mode 1 read in FIG. 9, data words are read from extended memory 12 during the time interval between the conjunctive occurrence of the $P_8$ RW2, start guard band-start read (DAD) and Q03 signals and the conjunctive occurrence of the $P_8$ and Q04 signals for a read operation. The start guard band-start read (DAD) signal, superimposed in dashed lines on the DRA waveform of FIG. 9, represents the start time for reading data from a guard band of extended memory 12. During the Q05 state of the Q counter and $P_0$, $P_1$ and $P_2$ timing signal times, three parity bits are read from extended memory and checked in a manner well-known in the art and not material to this invention.

Following the presetting of J counter 114 to a J05 state, and applying a QINT signal to memory controller 18, a retrieve data control word cycle of operation is performed as previously described. The retrieve data control word cycle of operation is performed utilizing the DCW relative address store in R register 96, FIG. 5, and which was provided by a previous DCW.

To illustrate the sequence of action during a Mode 1 write operation when the extended memory controller is controlling the execution of a DCW including a function code representing a write operation, Table II is provided.

If a binary configuration of 11010 is present in F register 152, and the A, R and S registers store data corresponding to addresses received as a result of retrieving a DCW, control of execution of a write operation is provided. The output of F decoder 154 provides the WRY signal, which is applied to main control matrix 112 in conjunction with J03 and K00 signals from K and J decoder 118, a Q00 signal from synchronization control 48, and the QDA pulse received as a result of the housekeeping operating requiring a main memory access in response to a J counter state of J03. As previously described, following each retrieval of a DCW, the extended memory controller performs a housekeeping operation and the J counter assumes a J03 state before controlling the operation specified by the F register contents.

TABLE II.—DATA CONTROL WORD—MODE 1 WRITE OPERATION
[F Register Contents=11010 (WRY)]

| Q Counter State | J and K Counter States | Control Signals | Action |
|---|---|---|---|
| Q00 | J03, K00 | QDA·WRY | Preset J and K counters=J02 and K02. Set FFY and FFZ flip-flops to binary 1 state. Generate and apply a QINT signal to memory controller. |
| Q00 | J02, K02 | WRY | Generate and apply RRS,DP (10001) signals to command lines for transmittal to memory controller. Transfer A register output signals to address lines 0–17. |
| Q00 | J02, K02 | QPIN | Generate and apply a QINT signal to memory controller. |
| Q00 | J02, K02 | QDA·WRY | Transfer signals on N bus lines 0–36 to 1st holding register decrement J counter=J01. |
| Q00 | J01, K02 | ---------- | Apply a binary "1" to address line 16. |
| Q00 | J01, K02 | QDA | Transfer signals on N bus lines 0–36 to 2nd holding register decrement J counter=J00. Reset FFY flip-flop to binary 0 state. |
| Q00 | J00, K02 | QDA | Transfer signals on N bus lines 0–36 to 3rd holding register. Decrement K counter=K01. |
| Q00 | J00, K01 | QDA | Transfer signals on N bus lines 0–36 to 4th holding register. Decrement K counter=K00. Reset FFZ flip-flop to binary 0 state. |
| Q00 | J00, K00 | FFY·FFZ | Generate a QACT signal. |
| Q00 | J00, K00 | QACT | Add 4 to A register. |
| Q00 | J00, K00 | DRS | Enable address comparator. Enable time signal distributor to generate $P_0$–$P_8$ signals in response to the QCLM clock signal Increment Q counter=Q01. |
| Q01 | J00, K00 | DRA·QCLM·$\overline{P_8}$ | Compare sector address of S register serially with address from extended memory. |
| Q01 | J00, K00 | $P_8$ | Check for address comparison, if comparison is achieved increment Q counter=Q02. |
| Q02 | J00, K00 | WRY·$P_6$·RW2·DAD | Increment Q counter=Q03. Parallel transfer of holding register output signals to shift registers. Set write flip-flop (enable write amplifiers) to binary 1 state. Set FFY and FFZ flip-flops to binary 1 state. Generate and apply QINT signal to memory controller. |
| Q02 | J00, K00 | $P_6$·WR2·DAD | Preset J and K counters=J02 and K02. |

TABLE II—Continued

| | Q Counter State | J and K Counter States | Control Signals | Action |
|---|---|---|---|---|
| | Q03 | J02, K02 | WRY | Transfer A register output signals to address lines 0-17. Generate and apply RRS,DP (10001) signals to command lines for transmittal to memory controller. |
| 200~ | Q03 | J02, K02 | QCLM·$\overline{P_6}$ | Shift data from shift registers to data tracks. |
| | Q03 | J02, K02 | QPIN | Generate and apply a QINT signal to memory controller. |
| | Q03 | J02, K02 | QDA | Transfer signals on N bus lines 0-36 to 1st holding register. Decrement J counter=J01. |
| | Q03 | J01, K02 | | Apply a binary "1" to address line 16. |
| | Q03 | J01, K02 | QDA | Transfer signals on N bus lines 0-36 to 2nd holding register. Decrement J counter=J00. Reset FFY flip-flop to binary 0 state. |
| | Q03 | J00, K02 | QDA | Transfer signals on N bus lines 0-36 to 3rd holding register. Decrement K counter=K01. |
| | Q03 | J00, K01 | QDA | Transfer signals on N bus lines 0-36 to 4th holding register. Decrement K counter=K00. Reset FFZ flip-flop to binary 0 state. |
| | Q03 | J00, K00 | $\overline{FFY}\cdot\overline{FFZ}$ | Generate a QACT signal. |
| | Q03 | J00, K00 | QACT | Add 4 to A register. |
| | Q03 | J00, K00 | $P_6$·WRY | Increment Q counter=Q04 Preset J and K counters=J02 and K02. Set FFY and FFZ flip-flops to binary 1 state. Generate and apply QINT signal to memory controller. |
| 200~ | Q03 | J00, K00 | $P_6$·RW2 | Parallel transfer of holding register output signals to shift registers. |
| | Q04 | J02, K02 | WRY | Transfer A register output signals to address lines 0-17. Generate and apply RRS,DP (10001) signals to command lines for transmittal to memory controller. |
| | Q04 | J02, K02 | QPIN | Generate and apply a QINT signal to memory controller. |
| | Q04 | J02, K02 | QDA | Transfer signals on N bus lines 0-36 to 1st holding register. Decrement J counter=J01. |
| | Q04 | J01, K02 | WRY | Apply a binary "1" to address line 16. |
| | Q04 | J01, K02 | QDA | Transfer signals on N bus lines 0-36 to 2nd holding register. Decrement J counter=J00 Reset FFY flip-flop to binary 0 state. |
| | Q04 | J00, K02 | QDA | Transfer signals on N bus lines 0-36 to 3rd holding register. Decrement K counter=K01. |
| | Q04 | J00, K01 | QDA | Transfer signals on N bus lines 0-36 to 4th holding register. Decrement K counter=K00. Reset FFZ flip-flop to binary 0 state. |
| | Q04 | J00, K00 | $\overline{FFY}\cdot\overline{FFZ}$ | Generate a QACT signal. |
| 200~ | Q04 | J00, K00 | QACT | Add 4 to A register. |
| | Q04 | J00, K00 | $P_6$·RW2 | Increment Q counter=Q05. |
| | Q05 | J00, K00 | $P_0$·WRY | Present Q counter=Q00. Reset write flip-flop to binary 0 state. Preset J counter=J05. Generate and apply a QINT signal to memory controller. |
| | Q00 | J05, K00 | ------------------ | Go to retrieve data control word cycle. |

The WRY signal is applied to the mode control 43 for generating the WRY and RW2 signals as previously described. The WRY, J03 and QDA signals are also applied to address count control matrix 158, FIG. 7, to generate signals for setting flip-flops FFY 160 and FFZ 162 to their binary 1 states. The J03, WRY and QDA signals in a similar manner are applied to interrupt control matrix 110 of FIG. 7 to generate a QINT pulse for applying on line 82 through control bus 85 to memory controller 18 to request a main memory access. The J03, QDA and WRY signals are applied to main control matrix 112 which responds to provide a signal for presetting the J and K counters to their respective J02 and K02 states. With the J and K counters respectively preset to states J02 and K02, K and J decoder 118 provides binary 1 output signals designated as K21 and J21 which are applied to encoder 122. In response to the J21 or K21 signals and a WRY signal, encoder 122 generates five signals which are applied to lines 80 to provide a binary coded signal combination of 10001 representing a RRS, DP command to memory controller 18. J21 and K21 signals are also applied by means of lines 120 to enable OR-gate 173, FIG. 5, to provide a binary 1 signal to one input lead of gates 174 during the presence of a J21 or K21 binary 1 signal. Gates 174 are thereby enabled to provide for transferring signals from A register 144 representing the main memory address to address lines 76 through control bus 85 to memory controller 18.

With reference to the waveforms for a RRS, DP command, FIG. 8, it is seen that following the transmittal of the QINT signal a cycle started signal designated as $TS is generated internally to the memory controller. After memory controller 18 has utilized the command and address signals to initiate a storage operation by memory 10, a QPIN signal is transmitted to extended memory controller 16. The J02, K02 and QPIN signals are applied to interrupt control matrix 110 to generate a QINT signal for applying by means for line 82 through control bus 85 to controller 18 for requesting a second successive double precision memory cycle. When the memory controller has retrieved, from memory 10, two words corresponding to the first two data words to be transferred and written in extended memory 12, a QDA signal is applied by means of line 78 to the extended memory controller 16. The QDA signal signifies that signals representing the first data word retrieved have been applied to N bus 74 lines 0–35 for transfer into a first register of holding registers 174. With J02, WRY and QDA signals applied to transfer control matrix 156, a QNCO signal is applied by means of lines 186 to data input gates 40. The QNCO signal applied to data input gates 40 enables a set of 36 gates to provide for transferring signals representing a 36 bit data word from N bus 74 to the first holding register of holding registers 174. The WRY, J02 and QDA signals are also applied to main control matrix 112 which generates a signal for decrementing the J counter to a J01 state. A J01 binary 1 signal is provided from the output of K and J decoder 118 along with a K21 binary 1 signal for applying to gate 182, FIG. 5, to enable gate 182 to provide a binary 1 output signal on address line $A_{22}$ to increment the address by a count of 2 for utilization by the memory controller during the second double precision memory cycle.

Memory controller 18 automatically provides a second QDA signal to extended memory controller 18 on line 90 of control bus 85, when signals representing the second word are present on N bus 74 lines 0–35. The J01 signal from the output of the J and K decoder 118 and WRY signal are applied to data transfer control matrix 156 with the QDA signal received by means of line 90. Data transfer control matrix 156 generates a QNC5 signal which is applied by means of lines 186 to data input gates 40. A set of gates within data input gates 40 respond to the QNC5 signal to transfer signals, corresponding to the second 36 bit data word, from N bus 74 to a second register of holding registers 174. The J01 and QDA signals are also applied to main control matrix 112 which generates a signal for decrementing J counter 114 to a state of J00. The J01 and QDA signals are applied to address count control matrix 158 to reset flip-flop FFY 160 to its binary 0 state. As previously described, the J02 and QPIN signals enable interrupt control matrix 110 to provide a QINT signal to controller 18 for requesting a second memory cycle. Memory controller 18 automatically responds to the second QINT signal to grant a second successive RRS, DP memory cycle utilizing command signals from encoder 122 applied to cable 80 and the address signals provided on address lines 76 of control bus 85.

Following decrementing the J counter to its J00 state and with the K counter in a K02 state, a QDA signal is received by means of line 90 through control bus 85 from memory controller 18. The QDA signal signifies that signals representing the third 36 bit word retrieved from main memory are now present on lines 0–35 of N bus 74. The K02 and J00 signals corresponding to K and J counter states of K02 and J00 are applied in conjunction with the QDA signal to data transfer control matrix 156 which provides a QPDO signal on lines 186 applied to data input gates 40. The QPDO signal enables a set of 36 gates within data input gates 40 to transfer signals representing the third 36 bit word from N bus 74 to a third register of holding registers 174. K02 and J00 signals, in conjunction with the QDA signal, are also applied to main memory controller matrix 112 for decrementing K counter 115 to a state of K01. With a K counter state of K01 and J counter state of J00, the next QDA pulse received from the memory controller signifies that signals representing the fourth 36 bit word retrieved from main memory are present on lines of N bus 74. The K01 and QDA signals are applied to data transfer control matrix 156 for generating a QPD5 signal on lines 185 to data input gates 40. The QPD5 signal enables a set of 36 gates within data input gates 40 to provide for transfer of the signals representing the fourth 36 bit word from N bus 74 to the fourth of holding registers 174. The K01 and QDA signals are also applied to main control matrix 112 for decrementing the K counter equal to a K00 state and are in a similar manner applied to address count control matrix 158 for resetting flip-flop FFZ 162 to its binary 0 state. With flip-flops FFY 160 and FFZ 162 both in their binary 0 states, their binary 0 output signals are applied to AND-gate 184 which provides a QACT signal. The resulting QACT signal is applied to the A register flip-flop corresponding to the address bit represented by the signal applied to line A21 for incrementing the data address contained in A register 144 by a count of 1, which automatically increases the representative address signals present on address lines 76 by a count of 4.

Synchronization control 48 has been initialized for operation previously during the data control word retrieval operation by presetting the Q counter to a state of Q00. With a Q counter state of Q00 and J counter state of J00 and K counter state of K00 states, the next sector signal appearing on waveform DRS illustrated in FIG. 10 provides a signal for incrementing the Q counter to a state of Q01. The sector signal also enables a time pulse distributor (now shown) within control 48 to provide nine timing signals $P_0$–$P_8$ in synchronism with the QCLM signal from extended memory to logic throughout extended memory controller 16. With the Q counter state of Q01, the sector address provided by the binary address signals illustrated by the DRA waveform in FIG. 10 is compared with the sector address from the S register.

At a Q counter state of Q01 and the time of occurrence of the $P_8$ timing signal, address comparison is checked in a suitable manner well-known in the art to determine if address comparison is achieved. If the addresses are equal, the Q counter is incremented to a state of Q02. If the addresses are not equal, the Q counter is preset to a state of Q00 and another comparison made following the next sector mark signal. With a RW2 signal present, the Q counter at Q02 state, the time pulse distributor providing an output signal $P_6$ and the presence of a start guard band-start write (DAD) signal (hereinafter referred to as a "DAD" signal) the Q counter is incremented to a state of Q03. The RW2, Q02 and $P_6$ signals are also applied to the data transfer control matrix 156 which generates a signal designated as QCET as illustrated in FIG. 4. The QCET signal is applied to a set of 144 gates within transfer gates 172 to provide for parallel transfer of signals representing the four 36 bit words in holding registers 174 to shift registers 64. The signals Q02 and $P_6$ are applied in a similar manner to main control matrix 112 to generate signals for presetting the K and J counters to states of K02 and J02 respectively.

Signals Q02, $P_6$, RW2, WRY and DAD are applied to AND-gate 187 which responds to provide a binary "1" output signal. The binary "1" output signal is applied to OR-gate 193 which responds to set write flip-flop 190 to its binary 1 state. The Q02, DAD, WRY and $P_6$ signals are also applied to address count control matrix 158 which provides signals to set flip-flops FFY 160 and FFZ 162, as illustrated in FIG. 7, to their binary 1 states. The Q02, $P_6$, DAD and WRY signals are in a similar manner applied to interrupt control matrix 110 to generate a QINT signal which is applied by means of line 82 through control bus 85 to memory controller 18.

Synchronization control 48 provides a Q34 binary 1 output signal when the Q counter is in the Q03 or Q04 states. The Q34 signal and each successive binary 1 signal appearing on the QCLM waveform illustrated in FIG. 10 are applied to inputs of AND-gate 170 illustrated in FIG. 5 to provide binary 1 output signal corresponding to each binary 1 signal of the QCLM waveform for a write operation. The binary 1 output signals are shift signals provided during Q counter states of Q03, Q04 and P signal times (except during the $P_6$ timing signal time when gate 192 is inhibited). The shift signals are provided during the time interval indicated by line 200 of Table II. During a write operation each binary 1 QCLM clock signal, except the signal corresponding to the $P_6$ timing signal, is provided as shift signals at the output of AND-gate 170 and applied by means of line 171, identified as QESR, to each of sixteen 9 bit character registers of shift registers 64 to serially shift each bit in each of the nine bit shift registers to write amplifiers 68.

Write amplifiers 68 are in an enabled state due to the presence of a write enable signal on line 195 resulting from the write flip-flop 190 being set to its binary 1 state, as previously described in response to WRY, Q02, RW2, DAD and $P_6$ signals. Therefore, bits shifted into the least significant bit position of each of sixteen 9 bit shift registers of shift registers 64 are written serially in a corresponding one of 16 tracks. The write operation continues in accordance with the sequence of operations illustrated in Table II.

The Q counter states of Q03 and Q04 in conjunction with the $P_6$ timing signal provide control of both memory controller 18 and extended memory 12 following receiving the start guard band-start write (DAD) signal by means of the DRA waveform, FIG. 10. The start guard band-start write (DAD) signal represents the start time for writing data into a guard band of extended memory 12. Upon receiving a $P_6$ timing signal in conjunction with a Q04 signal and a RW2 signal, the Q counter is incremented to a state of Q05. During the Q05 state the WRY, Q05 and $P_0$ signals applied to gate 194, as illustrated in FIG. 5, reset write flip-flop 190 to its binary 0 state thereby providing a binary 0 signal on output line 195 to disable write amplifiers 68 from further writing.

The MODE 1 WRITE-WRITE DATA waveform of FIG. 10 illustrates that data is written into extended memory during the time between $P_6$ time of the Q counter Q02 state coinciding with the start guard band-start write (DAD) signal and $P_6$ time of the Q counter Q04 state. The Q counter state of Q05 provides for writing three parity bits in a manner which is not material to this invention. The Q05 signal, resulting from a Q counter state of Q05, a WRY signal and a $P_0$ timing signal, are also applied to main control matrix 112 which provides a signal for presetting the J counter to a state of J05 for initiating a retrieve data control word cycle of operation as previously described.

Data control words are retrieved from main memory and the storage operations associated with transfer operations represented by the function portion of the DCW's are performed at guard bands until a DCW containing a function portion (10001) representing a Normal Mode of operation is received. The function portion will provide a binary configuration in the F register which designates a Normal Mode of operation to be controlled by extended memory controller 16. F decoder 154 responds to the binary configuration in the F register to provide the output signal designated CNO which in conjunction with a binary "0" F1 signal designates a Normal Mode of operation.

The CNO and F1 signals are applied to mode control 43, FIG. 6, for further decoding to provide control signals for a Normal Mode of operation. The CNO signal is also applied to main memory control 44. When the F register contains a binary configuration 10001, the CNO signal is provided at the output of decoder 154 and the F1 signal from F register 152 is a binary 0. The CNO signal is applied in conjunction with the QDAY and J03 signals resulting from the previously described housekeeping operation to gate 201 to provide a binary 1 output signal on one input lead of gate 210. The binary "0" F1 signal is inverted through inverter 211 to provide a binary "1" signal on a second input lead of gate 210. Gate 210 responds by providing a binary 1 input signal to gate 212, which responds to provide a binary 1 output signal to the R input of TM1 FF 204 to reset TM1 FF 204 to a binary "0" state. With TM1 FF 204 in a binary "0" state, a binary "0" output signal is present at the "1" output lead for inversion through inverter 214 to provide a binary "1" output signal to one input lead of gate 215. Gate 215 responds to the binary "1" input signal on one input lead in conjunction with the DRA input from access control 22 on a second input lead to provide output signals to one input of OR-gate 216. OR-gate 216 responds to provide the end sector-end write (DAD) and end sector-end read (DAD) signals of the DRA waveform FIGS. 9 and 10, during a Normal Mode of operation.

The CNO signal and J03 signals are again provided as inputs to control matrix 112, FIG. 7, to provide for presetting the J counter to a state of J05, thereby advancing extended memory controller 18 into a retrieve data control word cycle to retrieve a control word from memory 10 in the manner previously described. Following retrieval of the DCW, the J counter is preset to a J03 state and a housekeeping operation requiring a main memory access is again performed. If the DCW retrieved specifies a transfer operation, the QDA signal on line 78, resulting from the housekeeping operation, is utilized in conjunction with the J03 signal to advance the extended memory controller 18 into a control state for controlling execution of the operation represented by the decoded output of the F register in a Normal Mode of operation. DCW's received thereafter including function portions representing transfer operations provide for controlling Normal Mode storage operations at specified sectors of extended memory 12.

Data control words are retrieved from main memory as long as a representation of the address of the next DCW is provided by a previous DCW or until a DCW or PCW specifying a "disconnect" is received. A DCW providing a function code having an all binary "0" configuration, is entered into F register 152 and decoded by F decoder 154 to provide the DIS signal, FIG. 5. If a DCW specifies a disconnect operation, the DIS signal provided at the output of decoder 154 is applied to main control matrix 112. Matrix 112 responds to the DIS signal by providing an output signal which presets J counter 114 to the J00 rest state thereby terminating further retrieval of DCW's. Following a DCW initiated disconnect, it is necessary for a computer of the system to execute a connect instruction to provide a PCW specifying a "start," retrieve data control word operation before a mode of operation can be established and an information transfer can be controlled by extended memory controller 16.

During initialization of operation by a PCW specifying a "start," retrieve data control word operation, the extended memory controller is always placed in the Normal Mode of operation due to a QCON signal being applied from PCW decoder 42 to mode control 43. The QCON signal provides for placing TM1 FF 204, FIG. 6, in the binary 0 state as previously described. When it is desired to change from the Normal Mode to Mode 1 operation, a DCW must be retrieved from memory 10 having a function code specifying Mode 1. Following retrieving the DCW resulting in a mode change, a second DCW having a function code specifying a read or write function is required before an actual read or write operation in a guard band can be executed. When it is desired to change back to the Normal Mode, a DCW having a function code specifying a Normal Mode must be retrieved from memory 10. Thus, two successive DCW's are required to change from performing a read or write operation in one mode of operation before performing a read or write operation in another mode of operation.

Figure 3:
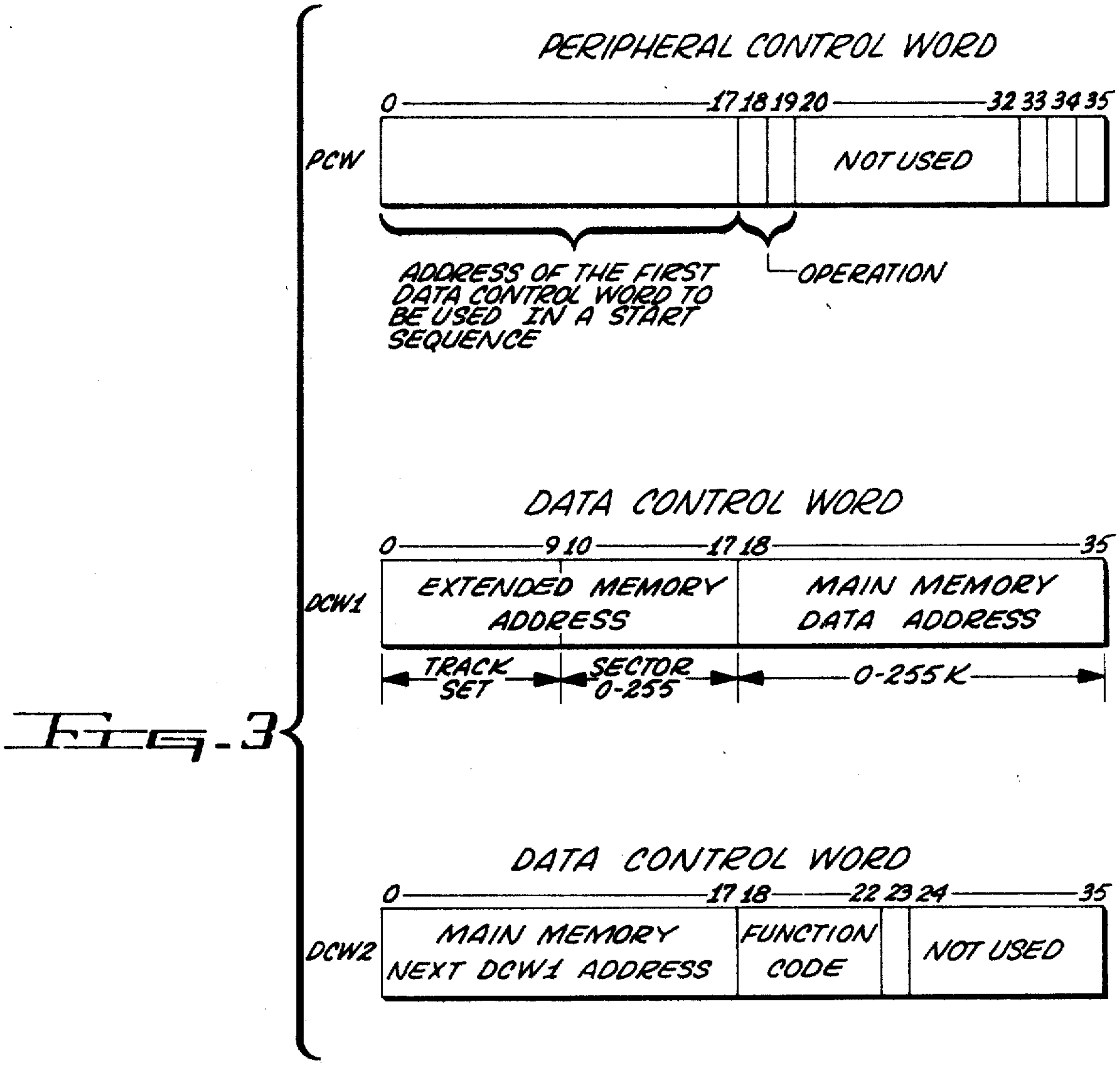
FIG. 3 is a symbolic diagram of the contents of the data control words employed in the system of FIG. 1.

If the peripheral control word bits 18 and 19 are both binary 0's, FIG. 3, a "disconnect" operation is specified. The PCW initiated disconnect is termed an emergency disconnect since the PCW specifying a "disconnect" may be accepted at any time during an extended memory controller busy condition, such as while controlling the execution of an operation specified by a DCW. The PCW disconnect operation may be initiated by a computer executing a connect instruction. The memory controller responds to the connect instruction execution by retrieving a PCW specifying a "disconnect" operation from a designated main memory address and supplies the signals representing the bits of the PCW on lines 0–35 of N bus 74 to extended memory controller 16. Signals corresponding to bits 18 and 19 of the PCW which are present on N bus 74 are applied on 2 lines designated as N 18, 19, FIG. 4 in conjunction with a QCN1 pulse, generated by the memory controller in response to execution of the connect instruction and applied on line 88, directly to PCW decoder 42. Decoder 42 responds to the QCN1 signal and binary 0 signals provided by bits 18 and 19 to generate a binary 1 signal designated as G46 which is applied to F register 152, FIG. 5. The G46 signal is also applied to main control matrix 112 as illustrated in FIG. 7. The G46 signal applied to F register 152 provides for resetting all of the F register flip-flops to their binary 0 states, while the G46 signal applied to main control matrix 112 provides for a signal to reset J counter 114 to the J00 rest state. Thus, with a PCW initiated disconnect, the F register flip-flops are all reset to their binary 0 state and the J counter is preset to a J00 state terminating any operation which may be in process. Following a PCW initiated disconnect, it is necessary for a computer of the system to execute a connect instruction to provide a PCW specifying a "start," retrieve data control word operation before an information transfer again can be controlled by extended memory controller 16.

While the principles of the invention have been made clear in an illustrative embodiment, there will be immediately obvious to those skilled in the art many modifications in structure, arrangement, proportions, the elements, materials and components used in the practice of the invention and otherwise which are particularly adapted for specific environments and operating requirements without departing from those principles. The appended claims are therefore intended to cover and embrace any such modifications within the limits only of the true spirit and scope of the invention.

What is claimed is:

1. A storage control system comprising: a circulating storage member having a plurality of periodically accessible sectors for storing information and guard bands for providing normally unutilized storage space between adjacent sectors; controllable access means coupled to said storage member for providing sequential access to said sectors and guard bands during a cycle of circulation of said member, said access means being controllable to perform selectively the storage operations of entering information into and retriving information from said sectors and guard bands as access is provided by the access means; signaling means for generating and transmitting a control signal in synchronism with the accessibility of each sector to said access means; and control means coupled to said signaling means to receive said control signal and responsive to said control signal for controlling said access means to perform one of said storage operations at a guard band.

2. A storage control system comprising: a circulating storage member having a plurality of periodically accessible sectors for storing information and guard bands for providing normally unutilized storage space between adjacent sectors; controllable access means coupled to said storage member for providing sequential access to said sectors and guard bands during a cycle of circulation of said member, said access means being controllable to perform selectively the storage operations of entering information into and retrieving information from said sectors and guard bands as access is provided by the access means; signaling means for generating and transmitting a control signal in synchronism with the accessibility of each sector to said access means; and control means coupled to said signaling means to receive said control signal and responsive to said control signal for controlling said access means to terminate performing one of said storage operations at a sector and responsive to said control signal for controlling said access means to start performing one of said storage operations at a guard band.

3. A storage control system comprising: a circulating storage member having a plurality of periodically accessible sectors for storing information and guard bands for providing normally unutilized storage space between adjacent sectors; controllable access means coupled to said storage member for providing sequential access to said sectors and guard bands during a cycle of circulation of said member, said access means being controllable to perform selectively the storage operations of entering information into and retrieving information from said sectors and guard bands as access is provided by the access means; signaling means for generating and transmitting a first control signal and a second control signal in synchronism with the accessibility of each sector to said access means; and control means coupled to said signaling means to receive said first and second control signals and responsive to said first control signal for controlling said access means to start performing one of said operations at a sector, and responsive to said second control signal for controlling said access means to terminate performing one of said storage operations at a sector and for controlling said access means to start performing one of said storage operations at a guard band.

4. A storage control system comprising: a circulating storage member having a surface on which information is adapted to be stored, said member having on the surface thereof a circumferential storage track, said track having a plurality of periodically accessible sectors for storing information and guard bands for providing normally unutilized storage space between adjacent sectors along the length of the track, each of said bands being of a length which is short relative to the length of said sectors; controllable access means coupled to said storage member for providing sequential access to said sectors and guard bands during a cycle of circulation of said member, said access means being controllable to perform selectively the storage operations of entering information into and retrieving information from said sectors and guard bands as access is provided by the access means; signaling means for generating and transmitting a control signal in synchronism with the accessibility of each sector to said access means; and control means coupled to said signaling means to receive said control signal and responsive to said control signal for controlling said access means to perform said storage operation of entering information into a guard band.

5. A data processing system comprising: a data processor; a circulating storage member having a plurality of periodically accessible sectors for storing information for use by said data processor in normal processing operations and a plurality of guard bands for providing storage space between adjacent sectors, each one of said guard bands corresponding to a respective one of said sectors; controllable access means coupled to said storage member for providing sequential access to said sectors and guard bands during a cycle of circulation of said member, said access means being controllable to perform selectively the storage operations of entering information into and retrieving information from said sectors and guard bands as access is provided by the access means; said guard bands storing information for testing the operability of said access means in communicating with corresponding sectors; signaling means for generating and transmitting a control signal in synchronism with the accessibility of each sector to said access means; and a control means coupled to said signaling means to receive said control signal and responsive to said control signal for controlling said access means to perform one of said storage operations at a guard band.

6. A data processing system comprising: a data processor; a circulating storage member having a surface on which information is adapted to be stored, said member having on the surface thereof a circumferential storage track, said track having a plurality of periodically accessible sectors for storing information for use by said data processor in normal processing operations and a plurality of guard bands for providing storage space between adjacent sectors along the length of the track, each of said bands being of a length which is short relative to the length of said sectors and each one of said bands corresponding to a respective one of said sectors; controllable access means coupled to said storage member for providing sequential access to said sectors and guard bands during a cycle of circulation of said member, said access means being controllable to perform selectively the storage operations of entering information into and retrieving information from said sectors and guard bands as access is provided by the access means; said guard bands storing information for testing the operability of said access means in communicating with corresponding sectors; signal means for generating and transmitting a control signal in synchronism with the accessibility of each sector to said access means; and control means coupled to said signaling means to receive said control signal and responsive to said control signal for controlling said access means to perform said storage operation of entering information into a guard band.

7. A storage control system comprising: a circulating storage member having a plurality of periodically accessible sectors for storing information and guard bands for providing normally unutilized storage space between adjacent sectors; controllable access means coupled to said storage member for providing sequential access to said sectors and guard bands during a cycle of circulation of said member, said access means being controllable to perform selectively the storage operations of entering information into and retrieving information from said sectors and guard bands as access is provided by said access means, said guard bands being spaces unaccessible to said access means when said access means is accessing sectors in succession; a storage means comprising a set of storage cell, each of said cells storing a control word, each of a plurality of said control words representing one of said storage operations and each of a plurality of said control words representing one of a plurality of modes of operations, a first one of said modes being a mode of operation for accessing said sectors and a second one of said modes being a mode of operation for accessing said guard bands; control means being responsive to a control word representing said first one of said modes and a control word representing a storage operation for controlling said access means to perform the storage operation represented by a control word at a sector and being responsive to a control word representing said second one of said modes and a control word representing a storage operation for controlling said access means to perform the storage operation represented by a control word at a guard band; and means for retrieving said control words from said storage means and for transferring the retrieved control words to said control means.

8. A storage control system comprising: a circulating storage member having a surface on which information is adapted to be stored, said member having on the surface thereof a circumferential storage track, said track having a plurality of sectors for storing information and guard bands for providing normally unutilized storage space between adjacent sectors along the length of the track, said guard bands having a length different from the length of said sectors; controllable access means coupled to said storage member for providing a sequential access to said sectors and guard bands during a cycle of circulation of said member, said access means being controllable to perform selectively the storage operations of entering information into and retrieving information from said sectors and guard bands as access is provided by said access means, said guard bands being spaces unaccessible to said access means when said access means is accessing sectors in succession; a storage means comprising a set of storage cells, each of said cells storing a control word, each of a plurality of said control words representing one of said storage operations and each of a plurality of said control words representing one of a plurality of modes of operation, a first one of said modes being a mode of operation for accessing said sectors and a second one of said modes being a mode of operation for accessing said guard bands; control means being responsive to a control word representing said first one of said modes and a control word representing a storage operation for controlling said access means to perform the storage operation represented by a control word at a sector and said control means being responsive to a control word representing said second one of said modes and a control word representing a storage operation for controlling said access means to perform the operation represented by a control word at a guard band; and means for retrieving said control words from said storage means and for transferring the retrieved control words to said control means.

9. The storage control means of claim 8 wherein each of said sectors are of equal length and each of said guard bands are of equal length with the length of said guard bands being short relative to the length of said sectors.

10. The storage control means of claim 8 wherein each of said sectors and guard bands are uniformly spaced along the length of the track.

11. The storage control means of claim 8 wherein the number of sectors is equal to the number of guard bands.

12. A storage control system comprising: a circulating storage member having a surface on which information is adapted to be stored, said member having on the surface thereof a circumferential storage track, said track having a plurality of sectors for storing information and guard bands for providing normally unutilized storage space between adjacent sectors, said guard bands having a length different from the length of said sector; controllable access means coupled to said storage member for providing sequential access to said sectors and guard bands during a cycle of circulation of said member, said access means being controllable to perform selectively the storage operations of entering information into and retrieving information from said sectors and guard bands as access is provided by said access means, said guard bands being spaces unaccessible to said access means when said access means is accessing sectors in succession; a storage means comprising a set of storage cells, each of said cells storing a control word, each of said control words including a function portion and an address field, a plurality of said control words including a function code representing one of a plurality of storage operations and a plurality of said control words including a function code representing one of a plurality of modes of operation, a first one of said modes being a mode of operation for accessing said sectors and a second one of said modes being a mode of operation for accessing said guard bands, said address field representing one of said sectors and one of said guard bands; control means responsive to a control word including a function code representing said first one of said modes and a control word including an address field and a function code representing a storage operation for controlling said access means to perform the storage operation at the sector represented by said address field and being responsive to a control word including a function code representing said second one of said modes and a control word including a function code representing a storage operation and an address field for controlling said access means to perform the storage operation at the guard band represented by said address field; and means for retrieving said control words from said storage means and for transferring the retrieved control words to said control means.

13. The storage control system of claim 12 wherein each of said sectors are of equal length and each of said guard bands are of equal length with the length of said guard bands being short relative to the length of said sectors.

14. A storage control system comprising: a circulating storage member having a surface on which information is adapted to be stored, said member having on the surface thereof a circumferential storage track, said track having a plurality of sectors for storing information and guard bands for providing normally unutilized storage space between adjacent sectors along the length of the track, said guard bands having a length different from the length of said sectors; controllable access means coupled to said storage member for providing sequential access to said sectors and guard bands during a cycle of circulation of said member, said access means being controllable to perform selectively the storage operations of entering data words into and retrieving data words from said sectors and guard bands as access is provided by the access means, said guard bands being spaces unaccessible to said access means when said access means is accessing sectors in succession; a storage means comprising a set of storage cells, each of said cells storing a control word, each of a plurality of said control words representing a plurality of different transfer operations, and each of a plurality of said control words representing one of a plurality of modes of operation, said sectors being accessible during a first one of said modes of operation and said guard bands being accessible during a second one of said modes of operation; a data word transfer means for receiving and transmitting data words, said transfer means coupled to said access means; a data word supply means for supplying data words to said transfer means; control means responsive to a control word representing said first one of said modes and a control word representing one of said transfer operations for controlling said access means to perform a storage operation for storing data words at a sector and for transmitting a transfer control signal to said transfer means and being responsive to a control word representing said second one of said modes and a control word representing one of said transfer operations for controlling said access means to perform a storage operation for storing data words at a guard band and for transmitting a transfer control signal to said transfer means; said transfer means coupled to said control means to receive said transfer control signal and being responsive to said transfer control signal to transfer data words received from said supply means to said access means to implement said storage operation; and means for retrieving said control words from said storage means and for transferring the retrieved control words to said control means.

15. A storage control system comprising: a circulating storage member having a plurality of circumferentially disposed sectors for storing information and guard bands for providing normally unutilized storage space between adjacent sectors, each of said sectors being adapted to store a first predetermined number of data words and each of said bands being adapted to store a second predetermined number of data words, said first and second predetermined numbers being different; controllable access means coupled to said storage member for providing sequential access to said sectors and guard bands during a cycle of circulation to perform selectively the storage operations of entering information into and retrieving information from said sectors and bands as access is provided by the access means, said guard bands being spaces unaccessible to said access means when said access means is accessing sectors in succession; a storage means comprising a first set of storage cells, each of said cells of said first set being adapted to store a data word and a second set of storage cells, each of said cells of said second set storing a control word, each of a plurality of said control words representing a plurality of different transfer operations, and each of a plurality of said control words representing one of a plurality of modes of operation, said sectors being accessible during a first one of said modes of operation and said guard bands being accessible during a second one of said modes of operation; a data word transfer means for receiving and transmitting data words, said transfer means coupled to said access means and said storage means; control means responsive to a control word representing said first one of said modes and a control word representing one of said transfer operations for controlling said access means to perform a storage operation for storing data words at a sector, for transmitting a transfer control signal to said transfer means and for transmitting a storage control signal to said storage means, and being responsive to a control word representing said second one of said modes and a control word representing one of said transfer operations for controlling said access means to perform a storage operation for storing data words at a guard band, for transmitting a transfer control signal to said transfer means and for transmitting a storage control signal to said storage means, said transfer control signal representing a transfer of data words from said storage means to said access control means and said storage control signal representing a retrieval of data words operation by said storage means; said storage means coupled to said control means to receive said storage control signal and responsive to said storage control signal to perform a retrieval operation for retrieving data words from said first set of cells and transmit the retrieved data words to said transfer means; said transfer means responsive to said transfer control signal to transfer data words received from said storage means to said access means to implement said one transfer operation; and means for retrieving said control words from said storage means and for transferring said retrieved control words to said control means.

16. A storage control system comprising: a circulating storage member having a surface on which information is adapted to be stored, said member having on the surface thereof a circumferential storage track, said track having a plurality of sectors for storing information and guard bands for providing normally unutilized storage space between adjacent sectors along the length of the track, said guard bands having a length different from the length of said sectors; controllable access means coupled to said storage member for providing selective access to said sectors and guard bands during a cycle of circulation of said member, said access means being controllable to perform selectively the storage operations of entering data words into and retrieving data words from said sectors and guard bands as access is provided by the access means, said guard bands being spaces unaccessible to said access means when said access means is accessing sectors in succession; a storage means comprising a set of storage cells, each of said cells storing a control word, each of a plurality of said control words representing a plurality of different transfer operations, and each of a plurality of said control words representing one of a plurality of modes of operation, said sectors being accessible during a first one of said modes of operation and said guard bands being accessible during a second one of said modes of operation; a data word transfer means for receiving and transmitting data words, said transfer means coupled to said access means, a data word utilization means coupled to said transfer means for receiving data words from said transfer means; control means responsive to a control word representing said first one of said modes and a control word representing one of said transfer operations for controlling said access means to perform a storage operation for retrieving data words at a sector and to transmit the retrieved data words to said transfer means and for transmitting a transfer control signal to said transfer means and being responsive to a control word representing said second one of said modes and a control word representing one of said transfer operation for controlling said access means to perform a storage operation for retrieving data words at a guard band and to transmit the retrieved data words to said transfer means and for transmitting a transfer control signal to said transfer means; said transfer means coupled to said control means to receive said transfer control signal and being responsive to said transfer control signal to transfer data words received from said access means to said utilization means; and means for retrieving said control words from said storage means and for transferring said retrived control words to said control means.

17. A storage control system comprising: a circulating storage member having a plurality of circumferentially disposed sectors for storing information and guard bands for providing normally unutilized storage space between sectors, each of said sectors being adapted to store a first predetermined number of data words and each of said bands being adapted to store a second predetermined number of data words, said first and second predetermined numbers being different; controllable access means coupled to said storage member for providing selective access to said sectors and guard bands during a cycle of circulation of said member, said access means being controllable to perform selectively the storage operations of entering data words into and retrieving data words from said sectors and bands as access is provided by the access means, said guard bands being spaces unaccessible to said access means when said access means is accessing sectors in succession; a storage means comprising a first set of storage cells, each of the cells of said first set being adapted to store a data word and a second set of storage cells, each of the cells of said second set storing a control word, each of a plurality of said control words representing a plurality of different transfer operations, and each of a plurality of said control words representing one of a plurality of modes of operation, said sectors being accessible during a first one of said modes of operation and said guard bands being accessible during a second one of said modes of operation; a data word transfer means for receiving and transmitting data words, said transfer means coupled to said access means and said storage means; control means responsive to a control word representing said first one of said modes and a control word representing one of said transfer operations for controlling said access means to perform a storage operation for retrieving data words at a sector and to transmit the retrieved data words to said transfer means, for transmitting a transfer control signal to said transfer means and for transmitting a storage control signal to said storage means, and being responsive to a control word representing said one transfer operation and a control word representing said second one of said modes for controlling said access means to perform a storage operation for retrieving data words at a guard band and to transmit the retrieved data words to said transfer means, for transmitting a transfer control signal to said transfer means and for transmitting a storage control signal to said storage means, said transfer control signal representing a transfer of data words from said storage means to said access control means and said storage control signal representing a storage operation by said storage means; said storage means coupled to said control means to receive said storage control signal and responsive to said storage control signal to receive data words from said transfer means and to perform a storage operation for storing data words in said first set of cells; said transfer means responsive to said transfer control signal to transfer data words received from said access control means to said storage means to implement said one transfer operation; and means for retrieving said control words from said storage means and for transferring said retrieved control words to said control means.

18. A storage control system comprising: a circulating storage member having a plurality of circumferentially disposed sectors and guard bands for storing data words, each of said sectors being adapted to store a first predetermined number of data words and each of said bands being adapted to store a second predetermined number of data words, said first and second predetermined numbers being different; controllable access means coupled to said storage member for providing sequential access to said sectors and guard bands during a cycle of circulation of said member, said access means being controllable to perform selectively the storage operations of entering data words into and retrieving data words from said sectors and bands as access is provided by the access means, said guard bands being spaces unaccessible to said access means when said access means is accessing sectors in succession; a storage means comprising a first set of storage cells, each of the cells of said first set being adapted to store a data word and a second set of storage cells, each of the cells of said second set storing a control word, each of a first plurality of said control words including a function code representing one of a plurality of different transfer operations, a first address field representing one of said sectors and one of said guard bands and a second address field representing one of said first set of cells, and each of a second plurality of said control words including a function code representing one of a plurality of modes of operation of said storage member, a first one of said modes controlling access to said sectors and a second one of said modes controlling access to said guard bands; a transfer means for receiving and transmitting data words, said transfer means coupled to said access means and said storage means; control means responsive to a control word including a function code representing one of said transfer operations, said first address field, and a control word including a function code representing said first mode for controlling said access means to perform a retrieval operation at the sector represented by said first address field and to transmit the retrieved data words to said transfer means and being responsive to a control word including a function code representing said one transfer operation, said first address field, and a control word including a function code representing said second mode to perform a retrieval operation at the guard band represented by said first address field and to transmit the retrieved data words to said transfer means, said control means being responsive to said second address field to transmit an address signal set to said storage means and being further responsive to said function code representing a transfer operation to transmit a transfer control signal to said transfer means and a storage control signal to said storage means, said transfer control signal representing a direction of transfer and said storage control signal representing a storage operation; said transfer means responsive to said transfer control signal to transmit said data words received from said access control means to said storage means to implement said one transfer operation; said storage means coupled to said control means to receive said storage control signal and said address signal set and responsive to said storage control signal and said address signal set to perform a storing operation for storing data words received from said transfer means at the cell represented by said second address; and means for retrieving said control means from said storage means and for transferring said retrieved control words to said control means.

19. A storage control system comprising: a circulating storage member having a plurality of circumferentially disposed sectors and guard bands for storing information; controllable access means coupled to said storage member for providing sequential access to said sectors and guard bands during a cycle of circulation of said member, said access means being controllable to perform selectively the storage operations of entering information into and retrieving information from said sectors and guard bands as access is provided by the access means, said guard bands being spaces unaccessible to said access means when said access means is accessing sectors in succession; a random access storage means having a plurality of addressable locations therein, each of a plurality of said locations containing a respective one of a succession of linked control words, each one of said control words including a link address and a function code, said link address representing the location storing the control word in said succession next following said one control word, each of a plurality of said function codes representing one of said storage operations, each of a plurality of said function codes representing one of a plurality of modes of operation, said sectors being accessible during a first one of said modes of operation and said guard bands being accessible during a second one of said modes of operation; a storage controller for controlling the execution of a succession of different types of storage operations, said controller coupled to said storage member; means for transferring a first of said control words to said storage controller; said storage controller being responsive to a function code in said first control word representing one of a plurality of said modes of operation for storing a portion of said function code representing one of said modes and being responsive to the link address in said first control word for transmitting a signal set representing said link address; said storage means being responsive to said signal set for retrieving and transmitting to said storage controller a second control word stored in the location represented by said signal set; and said storage controller being responsive to a function code in said second control word representing a storage operation and a stored portion of a function code representing said second one of said modes for controlling said access means to perform the operation represented by the function code in said second control word at a guard band and said storage controller being responsive to a function code in said second control word representing a storage operation and a portion of a stored function code representing said first one of said modes for controlling said access means to perform the operation represented by the function code in said second control word at a sector.

20. A storage control system comprising: a storage controller for executing a sequence of different functional storage operations, performed in one of a plurality of controller modes of operation, in response to a corresponding succession of control words, said controller transmitting a link address signal set when the next control word is required, each of said address signal sets representative of the storage address of the next control word to be executed; a first storage means being random access and having a plurality of addressable locations therein comprising data words and control words, each of said control words comprises a link address and a function code, said link address being representative of the storage address of a next control word and said function code representing one of a plurality of different storage operations; means for retrieving a first one of said control words from said storage means and transferring said first one to said controller; said controller coupled to said first storage means to receive said first one of said control words and responsive to the link address to transmit a first one of said link address signal sets; said first storage means coupled to said controller to receive a first one of said link address signal sets and responsive to said first one of said link address signal sets to retrieve and transmit a first next control word of said succession; said controller comprising mode control means for storing a mode code and coupled to said first storage means to receive said control words and responsive to said function code of said first next control word to store a mode code and responsive to said link address of said first next control word to transmit a second one of said link address signal sets, said first storage means responsive to said second one of said link address signal sets to retrieve and to transmit a second next control word of said succession, said controller responsive to said function code of said second next control word and said stored mode code to transmit a control signal designating a particular one of said different storage operations; and a second storage means having a plurality of storage locations therein comprising data words and coupled to said controller to receive said control signal and responsive to said control signal to provide said particular one of said storage operations for the retrieval and storage of data words.

21. A data processing system comprising: a data processor; a circulating storage member having a plurality of periodically accessible sectors for storing information for use by said data processor in normal processing operations and a plurality of periodically accessible guard bands for providing storage space between adjacent sectors, each of said guard bands corresponding to a respective one of said sectors; controllable access means coupled to said storage member for providing selective access to said sectors and guard bands during a cycle of circulation of said member, said access means being controllable to perform selectively the storage operations of entering information into and retrieving information from said sectors and guard bands as access is provided by the access means, said guard bands being spaces normally unaccessible to said access means when said access means is accessing sectors in succession and said guard bands storing information for testing operability of said access means in communicating with corresponding sectors; a storage means comprising a set of storage cells, each of said cells storing a control word, each of a plurality of said control words representing said storage operations of entering information into said sectors and guard bands and each of a plurality of said control words representing one of a plurality of modes of operation, said sectors being accessible during a first one of said modes of operation and said guard bands being accessible during a second one of said modes of operation; control means being responsive to a control word representing said second one of said modes and a control word representing a storage operation for entering information for transmitting a control signal and for controlling said access means to perform the entering of test information at a guard band and to prevent the entering of test information at a sector; means for supplying test information and coupled to said control means to receive said control signal and being responsive to said control signal to supply said test information to said access means to implement said storage operation for entering information; and means for retrieving said control words from said storage means and for transferring said retrieved control words to said control means.

References Cited

UNITED STATES PATENTS

| | | |
|---|---|---|
| 3,404,377 | 10/1968 | Frankel. |
| 3,355,718 | 11/1967 | Talarczyk. |
| 3,340,512 | 9/1967 | Hauck et al. |
| 3,270,324 | 8/1966 | Meade et al. |
| 3,257,645 | 6/1966 | Lekven. |
| 3,235,849 | 2/1966 | Klein. |

GARETH D. SHAW, Primary Examiner

PO-1050
(5/69)

UNITED STATES PATENT OFFICE
CERTIFICATE OF CORRECTION

Patent No. 3,525,081 Dated August 18, 1970

Inventor(s) Simon P. Flemming, Jr. and George P. Futas

It is certified that error appears in the above-identified patent and that said Letters Patent are hereby corrected as shown below:

In Column 1, lines 8 through 10 delete ", and General Electric Company, Schenectady, N.Y., a corporation of New York".

In Column 2, line 11 change "desruction" to --destruction--.

In Column 8, line 55 change "work" to --word--.

In Column 14, line 38 change "code" to --control--.

In Column 18, line 62 after "significant" insert --bits are accorded successively decreasing orders of significance--; line 64 after "most" insert --significant bit and the twenty-fourth bit delivered on --.

In Column 19, line 45 after "and" insert --DCW's--.

In Column 21, line 55 change "of" (second occurrence) to --or--.

In Column 22, line 5 after "band" insert --signals--.

In Column 25, line 47 after "from" insert --access--.

In Column 26, line 17 change "shaft" to --shift--; line 25 change "shaft" to --shift--.

SIGNED AND SEALED NOV 17 1970

(SEAL)
Attest:

Edward M. Fletcher, Jr.
Attesting Officer

WILLIAM E. SCHUYLER, JR.
Commissioner of Patents